US 6,643,737 B1

(12) United States Patent
Ono

(10) Patent No.: US 6,643,737 B1
(45) Date of Patent: Nov. 4, 2003

(54) CACHE LOCK DEVICE AND METHOD THEREFOR

(75) Inventor: Shinsuke Ono, Tokyo (JP)

(73) Assignee: NEC Electronics Corporation, Kanagawa (JP)

(*) Notice: Subject to any disclaimer, the term of this patent is extended or adjusted under 35 U.S.C. 154(b) by 0 days.

(21) Appl. No.: 09/440,143

(22) Filed: Nov. 15, 1999

(30) Foreign Application Priority Data

Nov. 13, 1998 (JP) .......................................... 10-323656

(51) Int. Cl.[7] .............................................. G06F 12/08
(52) U.S. Cl. ....................... 711/128; 711/133; 711/136; 711/144; 711/145
(58) Field of Search ................................. 711/128, 136, 711/133, 144, 145

(56) References Cited

U.S. PATENT DOCUMENTS 5,586,295 A * 12/1996 Tran ............................. 711/137
5,822,764 A * 10/1998 Hardage, Jr. et al. ........ 711/145
5,974,508 A * 10/1999 Maheshwari ................. 711/133
6,073,224 A * 6/2000 Wakins ........................ 711/202

FOREIGN PATENT DOCUMENTS

| JP | 52-2342 | 1/1977 |
| JP | 63-127349 | 5/1988 |
| JP | 1-205250 | 8/1989 |
| JP | 4-324547 | 11/1992 |
| JP | 6-243045 | 9/1994 |
| JP | 7-287669 | 10/1995 |
| JP | 8-339331 | 12/1996 |

* cited by examiner

Primary Examiner—Hiep T. Nguyen
(74) Attorney, Agent, or Firm—Foley & Lardner

(57) ABSTRACT

A cache lock device eliminates the need of transferring data to a cache at execution of a lock instruction by excluding the possibility of an invalid data to be locked in the cache. The cache lock device has a least recently used (LRC) output conversion circuit which converts a value of an LRU output to make a second entry an object of rewriting when a lock bit of the second entry is active and a comparison result of a tag value is in agreement and a valid bit is inactive. Therefore, a user or programmer can set a specified data in the locked entry defined by a Tag address and an Index address without setting the specified data in the entry before the lock bit is made active.

26 Claims, 15 Drawing Sheets

CACHE LOCK DEVICE AND METHOD THEREFOR

BACKGROUND OF THE INVENTION

1. Field of the Invention

The present invention relates to a cache apparatus and its control method, and more particularly to a cache apparatus including a cache lock device and its control method.

2. Description of the Related Art

In recent years, for the purpose of improving the utilization efficiency, especially the hit ratio, of a cache, a cache lock device which disables and controls data rewrite of a way which is holding specific data is drawing attention.

Before proceeding further, a brief description about a cache will be presented below. As shown in FIG. 17, a high speed memory 3 with small capacity which is interposed between an external memory 1 having a large capacity but a low data transfer rate, and a CPU which is an arithmetic unit part that processes data is generally referred to as a cache.

The main memory 1 with a large capacity generally has a low speed of the so-called access, which is the process of sending out necessary data to the CPU 2 after the output of an address from the CPU. It is the object of providing the cache 3 to copy frequently accessed data from the memory 1 to the cache 3 having a high access speed, at the timing of a first access, in order to shorten the response time in the subsequent accesses.

In the following, referring to FIG. 5(A), the configuration of a conventional cache 3 will be described first.

The cache 3 is composed of a selector which selects an entry based on the address of an index part of input data, and a memory array formed of a plurality of entries. The memory array consists of a tag memory array TagA, a data memory array DatA, a valid bit array VBA, an LRU bit array LRUBA, and a lock bit array LBA.

In such a cache 3, various arrays combined constitutes a unit called a way (constitution shown by the range surrounded by the broken line in FIG. 5(A)). In this example, however, ways that have the lock bit array LBA are limited to ways W0 and W1. The cache 3 shown consists of four ways, namely, way 0 (W0) to way 3 (W3), and is generally referred to as a 4-way cache.

An example of the constitution of data 4 used in such a cache apparatus 3 is shown in FIG. 5(B). The data 4 is divided into, for example, an address part 5 and a data part 6, and the address part 5 is further subdivided into a tag part 7, an index part 8, and an offset part 9.

The data sizes of various parts are, for example, 20 bits for the tag part 7, 6 bits for the index part 8, and 5 bits for the offset part 9, and the data part 6 consists of, for example, 256 bits (64 bytes).

A row having the same index number among various arrays is called collectively an entry, and one entry 10 comprises a tag part Tag, a data part Dat, a valid bit VB, an LRU bit LRUB, and a lock bit LB (a lock bit LB is given only to the entries within the ways W0 and W1).

As will be described in detail later, the tag part Tag stores tag data TAG which are high order bits of an address stored in the tag part 7 of data to be stored, and the data part Dat stores data DA0 stored in the data part 6 of the data to be stored.

The valid bit VB represents validity/invalidity of data being stored, and the LRU bit LRUB represents the entry 10 where the data read from the memory 1 may be overwritten.

The lock bit LB is used for designating the entry 10 which is desired not to be overwritten.

For an arbitrary memory address, the entry which is going to store the data at the address is selected as the entry 10 which has a row number matching the index value stored in the index part 8 of the data to be stored in the cache apparatus 3.

In other words, since in the cache apparatus 3, there exists one entry 10 having the same index value in each of the ways W0 to W3, there exist 4 entries, namely, 10-0, 10-1, 10-2, and 10-3 in the case of the 4-way cache.

As a result, in storing data of an arbitrary address in a cache, or retrieving data from the cache, it is only necessary to make access only to 4 entries 10-0, 10-1, 10-2, and 10-3.

In making access to data of certain memory address, first, the 4 entries 10-0, 10-1, 10-2, and 10-3 are retrieved in order to check whether there exists the data of the address in the cache 3.

When there exists the data, the entry 10-n storing the data is accessed, whereas when there does not exist the data, the data are read from the memory 1 to store the data in an appropriate entry among the 4 entries 10-0, 10-1, 10-2, and 10-3, then access is made to the entry 10-n.

In storing data to a prescribed entry 10-n, the index value in the index part 8 of the data to be stored is extracted, and an entry 10-n having row number identical to the index value is selected. Then, tag data TAG of the tag part 7 which are high order bits of the address part 5 in the data to be stored are stored in the tag part Tag of the entry 10-n, data DA in the data part of the data to be stored are stored in the data part Dat of the entry 10-n, and the valid bit VB is assigned a value 1.

Here, the valid bit VB is a bit showing validity/invalidity of the data DA of the data part Dat in the entry 10-n.

In retrieving data of a designated memory address from within the cache, first, as shown in FIG. 5(A), each of data of the tag part (Tag0 to Tag3), data part (Dat0 to Dat3), valid bit VB (VB0 to VB3), LRU bit LRUB (LRUB0 to LRUB3), and lock bit (LB0 to LB3) of the 4 entries, 10-0, 10-1, 10-2, and 10-3 are read from each of the ways W0 to W3.

Next, as shown in FIG. 6, these values are compared with the tag data TAG of the designated memory address in the data to be stored, and cache hit signals W0hit to W3hit and cache miss signals W0miss to W3miss are generated.

The hit/miss decision circuit shown in FIG. 6 comprises four comparator circuits 601 to 604 which compare TAG of 20 bits with each Tagn (n=0 to 3) of 20 bits, four AND gates 605 to 608 each of which receives the output of each comparator circuit at one end and receives each of the valid bits VBn (n=0 to 3) at the other end, and four inverters 509 to 512 each of which receives the output of each AND gate.

The cache hit signals Wnhit (n=0 to 3) are signals which have the value 1 when TAG=Tagn and VBn=1, and it means that an entry of a way with the value 1 for the signal is storing data of the designated memory address.

The cache miss signals Wnmiss (n=0 to 3) are signals which have the value 1 when TAG≠Tagn.

From what is described in the above, either one of W0hit to W3hit has the value 1 at cache hit, and can be used for controlling the connection between the data buses on the CPU side and the data buses (data0 to data3) of the ways, as shown in FIG. 7(A).

Further, all of the W0miss to W3miss have the value 1 at cache miss, and in combination with select signals W0sel to W3sel that will be described later these signals can be used for controlling the connection between the data buses on the memory side and data0 to data3, as shown in FIG. 7(B).

The bus selection circuit shown in FIG. 7(B) comprises an AND gate 701 which receives the cache miss signals Wnmiss (n=0 to 3), and four AND gates 702 to 705 whose respective one ends are connected in common to the output of the gate 701 and the way selection signals Wnsel (n=0 to 3) are connected to the other ends.

When there does not exists the data of the designated memory address in the four entries 10-0, 10-1, 10-2, and 10-3 retrieved, one entry is selected from among the four entries, the data is read from the memory, and stores the data in the selected entry, namely, the data is written over the currently stored data.

For the selection of the entry, use is made of an LRU. LRU stands for "least recently used", and it is represented by a lock bit LRU bit which holds the order of acception of access among the entries having identical row number of respective ways in order to make the least recently accessed entry as an object of rewriting.

The smallest value of the LRU bit LRUB is 0 which means that it is the entry which is most recently accessed among these entries.

The largest value of the LRU bit LRUB is 3 which shows that it is the least recently accessed entry among these entries.

In other words, the LRU bits LRUBs of various entries are updated as needed when access is made to each entry, so as to show either one of the values 0 to 3 in order to keep the timings of the access.

Accordingly, when data of a certain memory address is accessed and the data did not exist in the cache, the data are read from the memory, and the data are written over the entry having the oldest access time, namely, the entry with the maximum LRUB value, which is 3 in this example, of the LRU bits.

In order to determine a way having an entry to be rewritten, a way selection circuit 801 shown in FIG. 8 inputs LRUBn (n=0 to 3) and the way selection signal Wnsel (n=0 to 3) corresponding to the maximum value among them is given the value 1.

The reason for using the LRU bit array for the selection of an entry for overwriting of data is that it is known empirically that data which has once started to be accessed less frequently has a smaller possibility of being accessed again later.

What has been described in the above is the operation of a general cache using LRU bit array.

Note, however, that the generation logic of W0sel to W3sel is somewhat different for a cache configuration having a lock bit array. Namely, as shown in FIG. 12, since the entry 10 with the lock bit LB value of 1 shows that overwriting of data is inhibited, Wnsel (n=0 and 1) should not be equal to 1 when LBn (n=0 and 1) equals 1.

Because of this, the bit value of the LRU bit is masked with the inverted logic of the lock bit, and W0sel to W3sel are generated using the largest value of the masked result. As a result, when LB0 is 1, the masked result with LRUB0 is 0, and cannot be the largest value, so that W0sel cannot take on the value 1 and the way 0 will not be selected. Similarly, when LB1 is 1, W1sel cannot be 1 and the way 1 will not be selected.

Moreover, as shown in FIG. 7(B), from W0miss to W3miss and W0sel to W3sel, control signal lines are generated between the data buses of the memory 1 and the data buses data0 to data3 of various ways 10.

Based on these control signals, the data buses of the ways designated by W0sel to W3sel and the data buses on the memory side are connected, and the data read from the memory are written to the selected entry of the designated way.

Here, referring to a simple specific example, the case of executing cache lock using the conventional cache apparatus 3 will be described.

First, referring to FIG. 9, where each data within the memory 1 are stored in the cache 3 will be described.

As an example, assume that data stored in address 0xdffcaabb in the memory 1 are 0x88. Hereafter, in order to avoid confusion, values of the hexadecimal system will be preceded by the symbol 0x.

In the above, the address is given in the hexadecimal system which will be shown in binary numbers as given below.

1101 1111 1111 1100 1010 1010 1011 1011
(d) (f) (f) (c) (a) (a) (b) (b)

Of such an address, 20 bits (for example, from the 31st bit to the 12th bit) of high order bits are the tag data TAG, 6 bits (for example, from the 11th bit to the 6th bit) of intermediate order bits are the index (Index), and the remaining low order five bits (the fifth bit to the 0th bit) are the offset.

Accordingly, in the above address, the tag data, index, and offset are given respectively by; tag data: 1101 1111 1111 1100 1010 (=0xdffca) index: 1010 10 (=10 1010=0x2a) offset: 11 1011 (=0x3b)

The storage location of each data are determined by the value of LRU bit (LRUB), and the values of the index and the offset of the address in the cache 3.

In the above example, since the index is 0x2a (40 in the decimal system), it is stored in address 40 of the ways W0 to W3 of the cache 3 as shown in FIG. 9.

As shown in FIG. 9, the entry of each way W0 to W3 consists of Tag part of 20 bits, data part Dat of 256 bits (=64 bytes), 1 bit of valid bit VB, and 1 bit of modify bit Mo. From the value of the offset, it is determined where in the data part (Dat) of 64 bytes the data are to be stored.

Since in this example, the offset is 0x3b (59 in the decimal system) as shown in FIG. 9, the data (0x88) of 8 bits at the address 0xdffcaabb are stored at the 59th byte.

In this case, if a specific address is accessed, it is known empirically that the frequency is high that the adjacent addresses are accessed later. Therefore, in storing data from the memory 1 to the cache 3, data are stored with the size (64 bytes in FIG. 9) of the data part (Dat) of one entry 10 of the cache 3 as the unit.

Accordingly, in the above example, in storing data of 0xdffcaabb in the cache, data with addresses that have the same tag and the same index as those of 0xdffcaabb, namely, data with address 0xdffcaa80 (with the offset 0x00) to 0xdffcaabf (with the offset of 0x3f) are collectively stored in address 40 of the cache 3. The tag data TAG (0xdffca in the above example) of the address are written to the tag part (Tag) of the entry storing the data as shown in FIG. 9, and 1 is written to the valid bit VB of the entry 10 storing the data. This is to show that valid data are stored in cache entry 10 of the cache 1.

Moreover, in order to decide whether data of address which becomes the object of a load/store instruction are stored in the cache, the index and the tag data will be used.

For example, in order to decide whether data of address 0xdffcaabb are stored in the cache, the data should be stored in the entry of address 40 of the cache 3 if they are stored in the cache 3 since the index of 0xdffcaabb is 0x2a (40 in the decimal system). Accordingly, as shown in FIG. 10, the value of the data part (Dat) of address 40 of the entry 10 of the cache 3 is read to confirm whether the value is equal to the data value of 0xdffca in a comparator 1011 of 20 bits. Moreover, the output of the comparator 1101 is needed to be masked with valid bit using an AND gate 1102 in order to confirm whether the data are valid.

The valid bit is for preventing, at resetting, for example, when the tag field of address 40 of the cache is found at 0xdffca by chance, a misjudgment that data exist in the cache, also for storage check at the first load/store instruction to addresses 0xdffcaa80 to 0xdffcaabf.

This is due to the fact that no initialization is executed for the reason that the scale of the circuit for initializing all the internal bits of the cache becomes large, and even when they are initialized, it misjudgment occurs when the same address as that of the initialization is input. The role of the valid bit is to avoid such a misjudgment. At the time of turning on a power supply, all the valid bits are cleared to 0, and the valid bit of the entry to which data are transferred to the data part from the memory is set at 1.

By so doing, it is possible to guarantee that the tag part and the data of the entry with the valid bit 1 have effective values (different from those at the initial state).

In a cache lock device having a configuration described as in the above, the replacement method of entry data based on the LRU bit is a method to retain data that are frequently accessed within the cache as much as possible. However, there are cases, like data used by the instructions of an operating system (OS) in which, although data are not accessed frequently, it is desired to be transferred as fast as possible once accessed.

In order to handle such a case, there is needed a mechanism by which entries for storing data of specified addresses designated by the user are excluded from the objects of data replacement. This is the cache lock mechanism. In FIG. 11 and FIG. 12 are shown the configuration of the cache provided with the cache lock mechanism.

As in the above, lock bit LB is provided in each entry of the way W0 and way W1 in the cache apparatus. This lock bit LB can be written by giving the addresses of the way and the cache in a lock instruction. Accordingly, if it is desired to make data resident in the cache, what needs be done is to write 1 to the lock bit of the entry storing the data using the lock instruction.

An entry with lock bit 1 is excluded from the overwrite object of new data. FIG. 11 illustrates the case in which data with address 0xdffcaa80 to address 0xdffcaabf are stored in the cache.

Since the index is 0x2a (40 in the decimal system), data will be stored at address 40 of either one of the ways W0 to W3. In this example, since the LRU bit value of address 40 of the way W0 is the largest, data from the memory will be stored in address 40 of the way W0 if the cache lock mechanism did not exist. Since, however, the lock bit of address 40 of the way W0 is 1, address 40 is excluded from the object of replacement of new data, and address 40 of the way W3 which has the next largest LRU bit value LRUB is selected as the storage destination. This can be realized by selecting the maximum value obtained by masking the LRU output values LRUBs from various ways with the inverses of the output values of the lock bits LBs as shown in FIG. 12.

However, according to the conventional cache lock mechanism, data in the entry with written lock bit 1 are excluded from the object of data replacement regardless of the value of the valid bit.

In other words, when the lock bit of an entry with the valid bit 0 (storing invalid data) is given the value of 1, the entry cannot store new data sent from the memory, and continues to store the invalid data, which reduces the effective capacity of the cache.

In order to avoid this situation, it is necessary to transfer data desired to be made resident from the memory and to store them in the entry to be locked at the timing of setting the lock bit to 1 as shown in FIG. 13.

That is, after issuing an instruction to make access to data desired to be locked in the cache, it is necessary to issue a lock instruction while the data remain within the cache. Accordingly, the timing for issuing the lock instruction is a delicate problem to determine.

For this reason, in locking data, it is necessary to transfer data desired to be locked to the cache from the memory irrespective of whether the data will actually be accessed during the program. This results in a drawback that a transfer which could be unnecessary to begin with might have to be executed.

Moreover, it is difficult to specify in advance data that may actually be accessed during the program. Since such a situation arises frequently, and the transfer of data from the memory to the cache is slow, deterioration in the performance caused by the need for executing transfers which are theoretically unnecessary to begin with, is substantial.

In order to resolve such problems, a method of enhancing the cache hit ratio by updating an invalid data using a means effective to an idle cycle has been disclosed in, for example, Japanese Unexamined Patent Applications Laid Open No. Hei 4-324547. However, neither disclosure nor suggestion is given in such a publication as to a cache lock device constructed in such a way that data which is desired to be made resident in the cache is protected against easy overwriting on the cache apparatus. Moreover, a technique for obtaining a cache memory having a high bit ratio in the initial state by reducing the capacity and area of the tag memory is disclosed in Japanese Unexamined Patent Applications Laid Open No. Hei 6-243045, but neither disclosure nor suggestion is provided as to a cache lock device constructed in such a way that data desired to be made resident in the cache is protected against easy overwriting on the cache apparatus.

Furthermore, a memory device provided with an address comparison means which decides whether the contents of a tag register matches the block number of an access address is disclosed in Japanese Unexamined Patent Applications Laid Open No. Hei 8-339331, but neither disclosure nor suggestion is provided as to a cache lock device constructed in such a way that data desired to be made resident in the cache is protected against easy overwriting on the cache apparatus.

SUMMARY OF THE INVENTION

It is therefore an object of the present invention to provide a cache apparatus including a cache lock method, and its control method, by which the access speed to data desired by the user is enhanced by preventing an invalid data to be locked and retained in the cache, that is, by enhancing the cache efficiency.

In order to achieve the above object, this invention adopts the following basic technical constitution. Namely, a first mode according to this invention is a cache lock device including a main memory, a cache memory, a CPU which outputs a first address of a corresponding data on the main memory to a bus in response to a cache lock instruction, and outputs a corresponding second address on the main memory to the bus in response to an access instruction, a first entry selection circuit which selects a first entry on the cache memory upon receipt of the first address, a write circuit which writes tag data of the first address in a tag part of the first entry, a lock bit change circuit which sets active a lock bit of the first entry, a second entry selection circuit which selects a corresponding second entry on the cache memory in response to the second address, a tag comparator circuit which compares the value TAG of a tag part of the second address with the value tag of the tag part of the second entry, a lock bit detection circuit which detects the lock bit state of the second entry, an LRU output conversion circuit which changes the value of an LRU output so as to make the second entry to be an object of rewriting when the lock bit of the second entry is active, the comparison result of the tag values is in agreement, and a valid bit is inactive, and an LRU control circuit which causes to execute writing to the entry of rewrite object determined by the LRU output conversion circuit.

By adopting such a constitution, an invalid data can be prevented from being locked and retained within the cache and enhance the efficiency of the cache, and hence it is possible to obtain a cache apparatus including a cache lock device which enhances the access speed to data desired by the user.

Moreover, a second mode according to this invention is, in a cache lock device including a main memory, a cache memory which is formed by arranging a plurality of ways composed of a collection of a plurality of entries consisting of at least a tag memory array, a data memory array, a valid bit array and an LRU bit array, where a lock bit array is provided in each entry constituting at least a part of the ways, and a CPU which outputs address of data to be transferred to a corresponding cache memory on the main memory in response to a cache lock instruction, a load/store instruction or the like, the cache lock device which includes a way selection circuit which selects a way that has an entry on the cache memory having an entry number the same as the index value included in an index part of the data and also has a lock bit, upon receipt of the address in response to the cache lock instruction, an entry selection circuit which selects an entry on the cache memory having the entry number identical to the index number included in the index part of the data in the selected way upon receipt of the address, a write circuit which stores the tag data of the tag part included in the address of the data to be made resident in the selected entry, and a lock bit change circuit which sets the lock bit value to a second value in response to the storage of the tag data.

In a cache lock device with such a constitution, it is possible to determine easily and quickly the place of residence of the data desired to be made resident in the cache memory.

Furthermore, a third mode according to this invention is, in a cache lock device including a main memory, a cache memory formed by arranging a plurality of ways composed of a collection of a plurality of entries consisting of at least a tag memory array, a data memory array, a valid bit array, and an LRU bit array, where a lock bit array is provided in each entry constituting at least a part of the ways, and a CPU which outputs the address of data to be transferred to a corresponding cache memory on the main memory in response to a cache lock instruction, a load/store instruction or the like, the cache lock device which is composed of an entry selection circuit in which, in transferring a desired data from the memory means to the cache memory, the cache lock device selects from each of the plurality of ways an entry having the same entry number as an index value of an index part constituting the data desired to be transferred which exists within the memory means, in response to a load instruction or a storage instruction, a lock bit detection circuit which detects whether the lock bit array is provided for each of the plurality of selected entries, and outputs a discrimination signal, a valid bit decision circuit which decides when the discrimination signal from the lock bit detection circuit in a specified entry indicates the presence of a lock bit and its value is a second value, whether the valid bit in the entry is the second value, a data overwrite disabling circuit which inhibits the overwrite of data in a data part constituting the data desired to be transferred to the data part of the entry when the valid bit in the entry is the second value, a valid bit rewrite circuit which enables the overwrite of data of the data part constituting the data desired to be transferred to the data part of the entry when the value of the lock bit in the specified entry is the second value, the value of a tag part of the selected entry matches the tag constituting the data to be transferred, and the value in the valid bit array is the first value, and rewrite the bit value of the valid bit in the valid bit array of the entry to the second value, and an LRU output conversion circuit which changes the value to the first value.

By adopting such a constitution, when a new data desired to be made resident in the cache memory are generated against a plurality of data that are already stored in the cache memory, it is possible to judgment exactly, easily, and quickly as to which data of the plurality of data stored in the cache memory needs be replaced by the data desired to be newly made to be resident.

A fourth mode according to this invention is, in a cache lock device including a main memory, a cache memory formed by arranging a plurality of ways composed of a collection of a plurality of entries consisting of at least a tag memory array, a data memory array, a valid bit array, and an LRU bit array, where a lock bit array is provided to each entry constituting at least a part of the ways, and a CPU which outputs to a bus the address of data to be transferred to a corresponding cache memory on the main memory in response to a cache lock instruction, a load/store instruction or the like, the cache lock device includes a control consisting of a means for extracting data in a tag part and an index in an index part in the address of a data desired to be made resident in the cache memory in response to a cache lock instruction, a means for selecting a way having the lock bit array from among a plurality of ways, a means for selecting an entry having the same entry number as the index value of the index part in an address part of the data desired to be made resident in the cache apparatus, a means for storing data of a tag part in the data desired to be made resident in the tag part of the selected entry, and a means for setting the value of the lock bit in the entry where the tag part data of the data desired to be made resident, to a second value.

By adopting such a constitution, it is possible to execute the locking operation of data easily and quickly when there are generated data which need be made resident in the cache memory in the early stage after a reset.

A fifth mode according to this invention is, in a cache lock device including a main memory, a cache memory formed by arranging a plurality of ways composed of a collection of a plurality of entries consisting of at least a tag memory array, a data memory array, a valid bit array, and an LRU bit array, and a CPU which outputs to a bus the address of a corresponding data on the main memory in response to a cache lock instruction, a load instruction, a store instruction or the like, a cache lock method which consists of a first step of selecting data to be transferred to the cache memory and extracting an index value of designated address when transferring the data to be made resident in the cache memory to the cache memory, a second step of selecting from cache way an entry having the entry number that is the same as the index value of the data to be transferred to the cache memory, a third step of discriminating for each of the selected entries whether it possesses a lock bit LB, a fourth step of judging whether the lock bit LB is a second value or a first value when there exists an entry having the lock bit LB in the selected entries, a fifth step of comparing the value of a tag part of the entry with the tag value of the designated address when it is found in the fourth step that the lock bit LB of the selected entry is the second value, a sixth step of judging whether the value of a valid bit of the entry is the second value or the first value when it is found in the fifth step that the lock bit LB of the entry is the second value and the result of comparison of the tag values is in agreement, a seventh step of inhibiting the overwrite to the entry by masking the LRU output of the entry to the first value when it is found in the sixth step either that the comparison result of the tags is in disagreement though the value of the lock bit is the second value or that the value of the valid bit is the second value, an eighth step of making the entry to be an object of overwrite by setting the LRU output of the entry to the second value and masking the LRU outputs of the other selected entries to the first value when it is found in the sixth step that the value of the lock bit is the second value, the comparison result of the tag values is in agreement, and the value of the valid bit is the first value, a ninth step of selecting the entry with the largest LRU output from among the selected entries, and a 10th step of overwriting the data and writing the second value to the valid bit to the entry selected in the ninth step.

By adopting such a method, it is possible to exactly, easily, and quickly judge as to which data out of a plurality of data already stored in the cache memory needs be replaced by new data desired to be made resident when there are generated data desired to be made resident newly in the cache memory.

Finally, a sixth mode according to this invention is, in a cache lock device including a main memory, a cache memory formed by arranging a plurality of ways composed of a collection of a plurality of entries consisting of at least a tag memory array, a data memory array, and an LRU bit array, and a CPU which outputs to a bus the address of a corresponding data on the main memory in response to a cache lock instruction, a load instruction, a store instruction or the like, the cache lock method consisting of a first step of executing the cache lock instruction, selecting data to be transferred to the cache memory, and extracting an index value of a designated address when the data to be made resident in the cache memory is transferred first to the cache memory following initialization of the cache lock device, a second step of selecting a way having a lock bit LB from among the ways, a third step of selecting from each way an entry having the entry number the same as an index value of the data to be transferred to the cache memory, a fourth step of selecting either one of the entries when it is found in the second step that there exist entries having the lock bit LB, and a fifth step of storing tag data of the data to be made resident in the cache memory in a tag part of the selected entry, and setting the value of the lock bit LB to the second value.

By adopting such a method, it is possible to execute easily and quickly the locking operation of the data when there are generated data needed to be made resident in the cache memory in the initial stage following a reset.

BRIEF DESCRIPTION OF THE DRAWINGS

The above and other objects, features and advantages of the present invention will be more apparent from the following description taken in conjunction with the accompanying drawings, in which.

DESCRIPTION OF THE PREFERRED EMBODIMENTS

Figure 1:
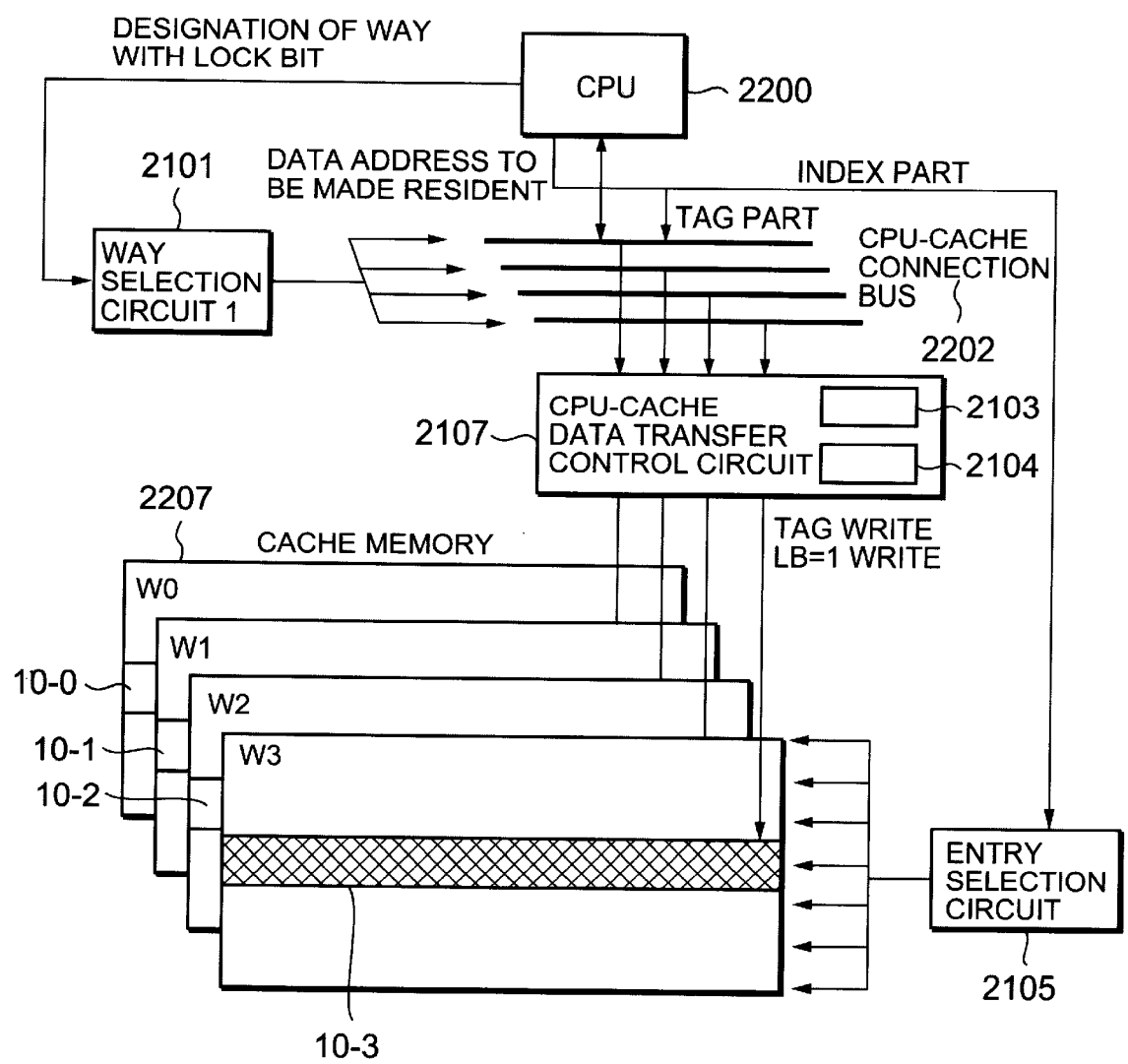
FIG. 1 is a block diagram showing a specific example of cache lock device according to this invention.

The cache lock device and the cache lock method according to this invention improve the mechanism of locking data (namely, not to be replaced by another data) that are stored in the cache by means of the technical constitution as described in the above.

Namely, in contrast to the conventional technique which has a possibility of locking an invalid data, the present invention prevents the residence of an invalid data, when the invalid data are going to be locked, by storing a valid data in an originally intended entry (place for storing data) for storage, then locking the cache.

In other words, in the cache lock device and the cache lock method according to this invention, when the user desires to lock a specific data to be made resident in the cache apparatus, locking of the data can be executed automatically without being conscious of the timing for executing the locking.

Embodiment

Referring to the drawings, an embodiment of the present invention will be described in detail in the following.

Figure 2:
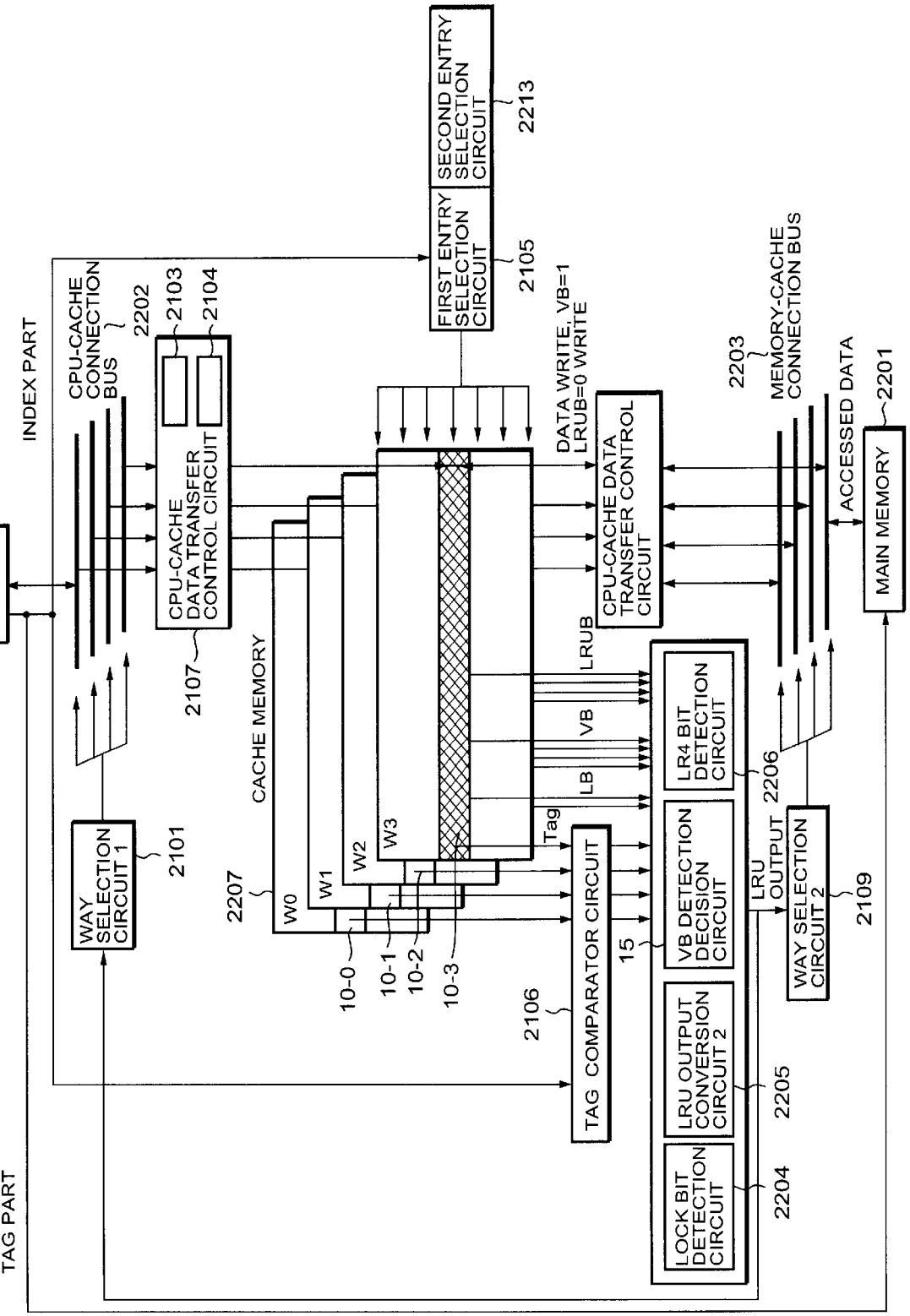
FIG. 2 is a block diagram showing another specific example of the cache lock device according to this invention.

In FIG. 1 and FIG. 2 showing summaries of the configuration of a specific example of the cache lock device according to this invention, comprises a main memory 2201, a cache memory 2207, a CPU 2200 which outputs the number of a way, which has a log bit and data are desired to be made resident therein, and a first address of the corresponding data on the main memory 2201 are output to buses 2202 in response to a cache lock instruction, or outputs a corresponding second address on the main memory 2201 to the buses 2202 in response to an access instruction, a way selection circuit 2101 which selects ways W0 to W3 on the cache memory 2207 upon receipt of the number of the way intended to make the data resident therein, a first entry selection circuit 2105 which selects entries 10-0 to 10-3 on the cache memory 2207 upon receipt of the first address, a write circuit 2103 which writes a tag data of the first address to a tag part of a first entry determined as one out of 10-0 to 10-3, a lock bit change circuit 2104 which sets the lock bit of the first entry active, a second entry selection circuit 2213 which selects the corresponding second entry from among 10-0 to 10-3 on the cache memory 2207 in response to the second address, a circuit 2106 which compares each of the values of the tag parts of the second entry 10-0 to 10-3 with the tag value of the second address, a lock bit detection circuit 2204 which detects the state of the lock bit of the second entry, a valid bit detection circuit 15 which reads the valid bit of the second entry, an LRU bit detection circuit 2200 which reads the LRU bit of the second entry, an LRU output conversion circuit 2205 which converts the LRU value read out, a second way selection circuit 2109 which selects a way for storing the data of the second address read from the memory, a data transfer control circuit 2108 which stores data read from the memory to a third entry determined as one out of the second entries based on the output of the way selection circuit 2109 and the output of the entry selection circuit 2105, sets 1 to the valid bit of the third entry, and sets 1 to the LRU bit, a first way selection circuit 2101 which selects a way for delivering the data to the CPU when receives a load instruction or for storing the data from the CPU when receives a store instruction, and a data transfer control circuit 2107 which controls the data transfer between the CPU and the cache to a fourth entry which is determined uniquely from the output of the way selection circuit 2105 and the output of the entry selection circuit 2105.

In other words, although FIG. 1 and FIG. 2 have almost common circuit means, FIG. 1 shows a circuitry when the cache lock device is used mainly for the case of executing the locking operation of the cache memory 2207 in accordance with a cache lock instruction, whereas FIG. 2 shows a circuitry which is used when data stored in the main memory 2201 are transferred to the cache memory 2207 in accordance with a load instruction or a store instruction.

Accordingly, the same or different circuits are used depending upon the operational procedure.

For example, the first entry selection circuit 2105 and the second entry selection circuit 2213 shown in FIG. 2 may employ identical circuitry.

Similarly, regarding the address of data read from the main memory, the address of data read in response to a cache lock instruction and the address of data read in response to a load instruction or a store instruction may or may not be identical.

The cache memory 2207 used in this invention is formed by arranging a plurality of ways W0 to W3 composed of a collection of a plurality of entries 10-0, 10-1, 10-2, and 10-3 consisting of at least a tag memory array TagA, a data memory array DatA, a valid bit array VBA, an LRU bit array LRUBA, and a lock bit array LBA.

In the cache lock device according to this invention has to be provided with a lock bit LBA for at least a part of the entries 10-0 to 10-3 constituting the ways W0 to W3.

The cache lock device according to this invention has to include further a first way selection circuit 2101 and a second way selection circuit 2109 each of which selects one way out of the group of ways W0 to W3.

The entry selection circuit 2105 is a means for selecting an entry having the same entry number as the index value in the index part included in the address part existing in the memory 2201.

Moreover, the lock bit conversion circuit 2104 used in this invention is a means for storing the tag data TAG of the tag part constituting the data which is desired to be made resident in the cache apparatus in the tag part Tag constituting the tag memory array of the selected entry, then setting the value of the lock bit constituting the lock bit array in the entry to 1.

Furthermore, the lock bit detection circuit 2204 in this invention is a means for judging whether the lock bit array is provided in respective ones of the plurality of selected entries, or for judging the lock bit value is 1 or 0 when the entry is provided with the lock bit array.

Furthermore, the LRU output conversion circuit 2205 used in the cache lock device shown in FIG. 2 according to this invention is a means in which the order of the LRU bit values allocated to various entries in order to hold the order of acceptance of access among the entries having the same index number in various ways, are changed among the entries whenever access is made to a specified entry, or do not change the LRUB values or setting the values to desired values under specified conditions.

Furthermore, the way selection circuit 2109 used in this invention is a means for selecting an entry with the largest LRUB value among the entries.

Figure 3:
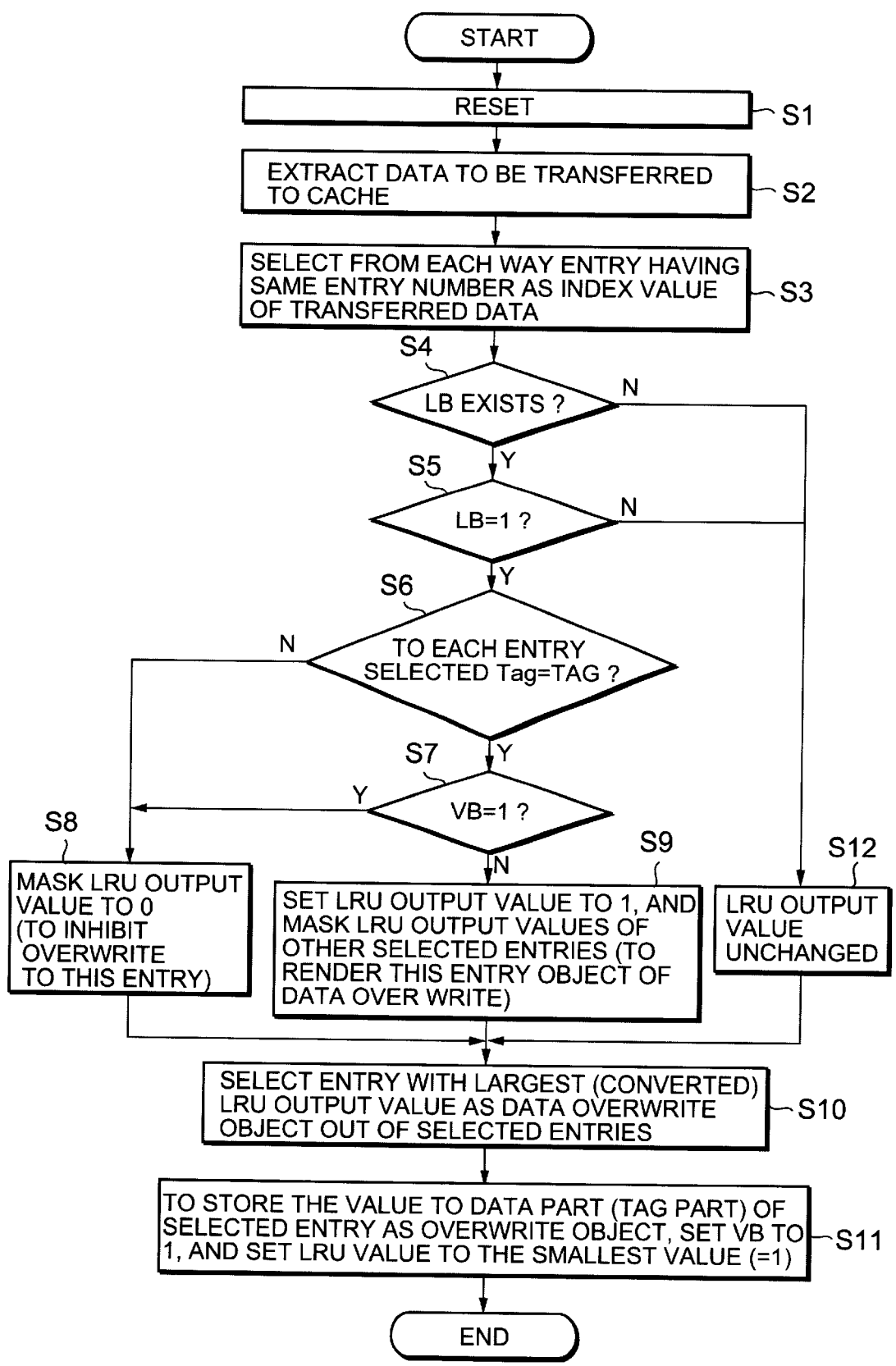
FIG. 3 is a flow chart describing the operational procedure for one specific example of the cache lock method according to this invention.
Figure 4:
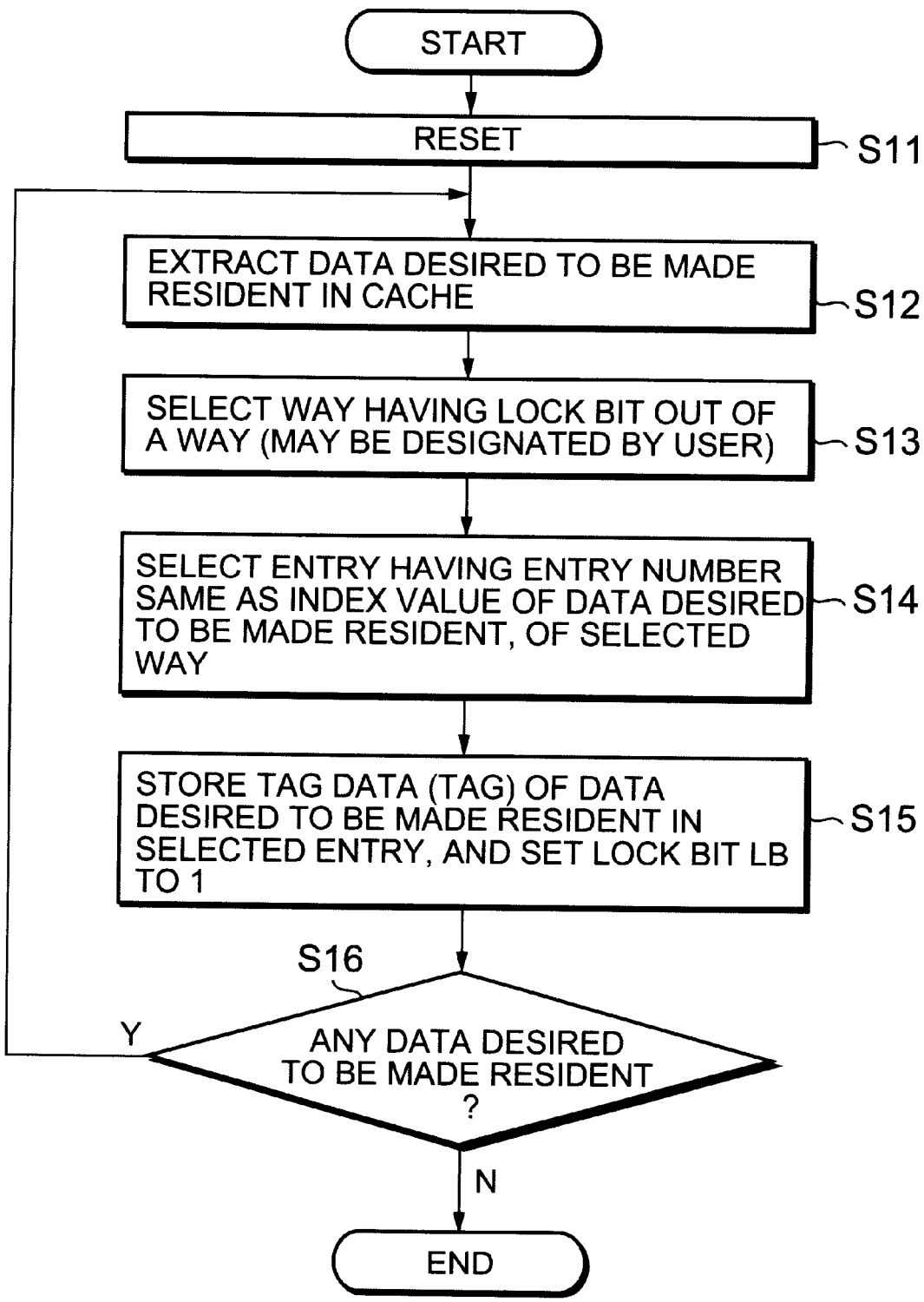
FIG. 4 is a flow chart describing the operational procedure for another specific example of the cache lock method according to this invention.
Figure 5A:
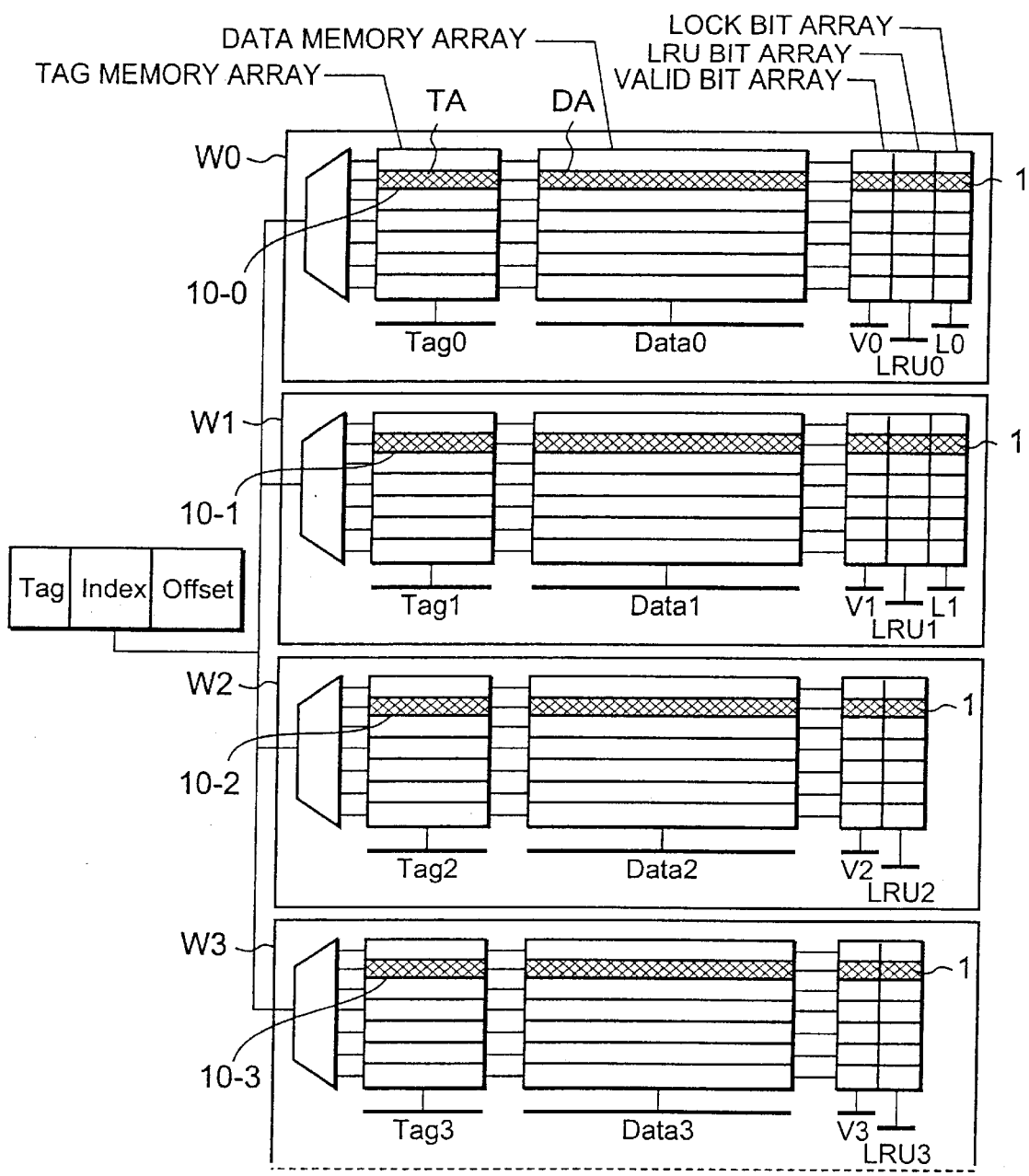
FIG. 5(A) is a block diagram showing the configuration of one specific example of the cache apparatus used in this invention.
Figure 5B:
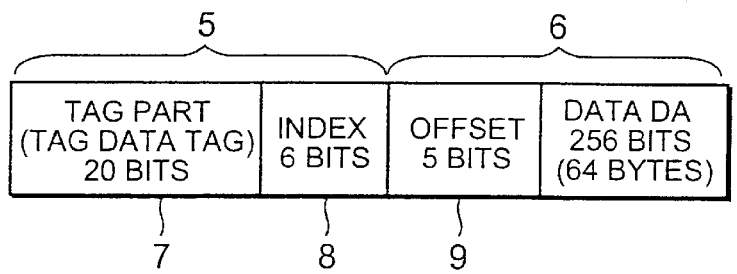
FIG. 5(B) is a data structure used in this invention.

Referring to FIG. 3 and FIG. 4, the construction of a specific example of the cache lock method using the cache lock device according to this invention shown in FIG. 1 and FIG. 2 will be described in detail next.

FIG. 1 shows the block which will be actuated when the CPU issues a cache lock instruction.

That is, in executing the cache lock instruction, the address of a user designated data desired to be locked and the way which stores the data (a way having the lock bit) are output from the CPU 2200. The tag part of the address of the data desired to be locked is transferred to CPU-cache connection buses 2202, the index part is transferred to the entry selection circuit 2105 being an index selection circuit, and designation of the way for storing the data to be locked is transferred to the way selection circuit 2101.

The entry for storing the data desired to be locked is determined by the output of the way selection circuit 2101 and the output of the entry selection circuit 2105 which is an index selection circuit.

The transfer control circuit 2107 writes the value of the tag part of the data desired to be locked found on the CPU-cache connection buses 2202 into the tag part of the entry determined in the above, and at the same time the lock bit of the entry is set to 1.

In this case, locking takes place irrespective of the state of the valid bit of the designated entry. The flow of the operation will be described by reference to the flow chart shown in FIG. 4.

Namely, after the start, the cache lock device is reset in step S11. Then, the cache locking is executed in step S12 in which data to be transferred to the cache memory is selected, and the index value of the designated address is extracted.

Then, ways having the lock bit LB are selected from all the ways in step S13, and entries having entry address with the same value as the index value of the data to be transferred to the cache memory are selected from the various ways in step S14.

Then, when it is found in step S13 that there exist entries having the lock bit LB, either one of the entries is selected, and the tag data of the data to be made resident in the cache memory are stored in the tag part of the selected entry, and the lock bit LB is set to 1 in step S15.

Following that, it is judged whether there still exist data which are desired to be made resident in the cache memory in step S16, and if the answer is YES, it returns to step S12 to repeat the above process, and if the answer is NO, the procedure is ended.

FIG. 2 shows the blocks which are actuated when the CPU of the cache lock device according to this invention executes load/store instructions.

In executing load/store instructions, first, the address which is the object of the load/store instructions is output from the CPU 2200.

The address is transferred to the entry selection circuit 2105 which is an index selection circuit of the address, and the values of the tag Tag, the valid bit VB, the LRU bit LRUB stored in the entry with the same address as the value of the index part are read from each way.

In addition, the value of the lock bit LB is read from the entries having the lock bit.

Each of the value Tag of the tag read from the entry of each way is compared with the value of tag TAG of the address of the access object in the tag comparator circuit 2106.

When the result of comparison is in agreement, and the valid bit of the entry is 1, it means that the accessed data exists stored in the cache. Accordingly, the data are read from the entry, and are transferred to the CPU 2200 via the CPU-cache data transfer control circuit 2107 and the CPU-cache connection buses 2202.

Otherwise, it means that the accessed data is not stored in the cache, so the address of the data accessed is delivered to the main memory 2201, and the data is read out to the memory-cache connection buses 2203.

Moreover, the LRU output conversion circuit 2205 determines the way whose entry is to be overwritten with the data read from the main memory 2201.

Of the entries with the lock bit and having their values 1, those entries in which the result of comparison in the tag comparator circuit 2106 is in disagreement or their valid bit are 1, are output with their LRU bit values masked with 0.

The bit values of the other entries are output as they are. Moreover, of the entries having the lock bit with the value 1, the entries for which the comparison result of the tags in the tag comparator circuit 2106 is in agreement and having the valid bit values of 0 are output with their LRU bit value set to 1, and the LRU bit values of the other entries are output by masking them with 0.

The second way selection circuit 2 (2109) selects a way which has the maximum output by receiving the output of the LRU output conversion circuit 2105, and transfers it to the memory-cache connection buses 2203.

In this manner, data read from the main memory 2201 are output to the buses corresponding to the selected way.

The CPU-cache data transfer control circuit 2107 or 2108 writes data to the entry shown by the entry selection circuit 2105 which is an index selection circuit of the selected entry, set the valid bit of the entry to 1, and sets the LRU bit value to 0.

The flow of the operations will be described by reference to the flow chart shown in FIG. 3.

After the start, the device is reset in step S1, and a load instruction or a store instruction is executed, and data desired to be transferred to the cache memory are extracted in step S2. Then, entry having the same entry number as the index value of the data to be transferred to the cache memory is selected from each way in step S3, and whether the entry has the lock bit is judged in step S4.

If the answer is NO in step S4, its LRU output value is unchanged, and proceeds to step S10 which will be described later, and if the answer is YES in step S4, it proceeds to step SS to judge whether the value of the lock bit LB is 1.

If the answer is NO in step S5, its LRU output value is unchanged, and proceeds to step S10 described later, and if the answer is YES in step S5, it proceeds to step S6 where for each of the selected entries, the value TAG of the tag part in the address of the data to be transferred and the value Tag of the entry are compared in the tag comparator circuit.

If the answer in step S6 is NO, namely, in an entry with active logic bit among the entries, when the result of comparison is in disagreement, it proceeds to step S8 where the LRU output of the entry with unmatched comparison result of the tag values is masked with 0, and overwriting of data to the entry is inhibited.

If the answer in step S6 is YES, it proceeds to step S7 where whether the value of VB of the valid bit is 1 is judged.

If the answer in step S7 is YES, namely, in the entry where its lock bit is active among the specified entries, when the comparison result of the tag values is in agreement and its valid bit is active, it proceeds to step S8 where the LRU output of the entry with matched comparison result of the tag values is masked with 0, and the operation inhibiting overwriting of data to the entry is executed.

If the answer in step S7 is NO, namely, in an entry with an active lock bit, when the valid bit is inactive although the comparison result of the tag values is in agreement, it proceeds to step S9 where the LRU output of the entry with matched comparison result of the tag values is set to 1, and the LRU outputs of the other entries are masked with 0 to execute the operation of permitting overwriting of data to the entries.

Then, the entry with the largest LRU output value after the conversion operation among the selected entries is selected as the entry for executing data writing (overwriting) in step S10, and it proceeds to step S11 where the specified data are stored in the tag part and the data part of the entry selected as the object of overwriting, and the procedure is ended by setting its valid bit to 1.

In this invention, the procedure for storing data desired to be made resident in the cache apparatus in a specified entry has a feature in that the cache lock device stores only the tag data stored in the tag part in the data desired to be made resident in the tag part of the entry that has the same value of the entry number as the index data stored in the index part of the data desired to be made resident. Then, in response to a load or store instruction corresponding to the access instruction to the data desired to be made resident, data stored in the data part of the data desired to be made resident are preferentially stored in the data part of the specified entry.

In other words, the present invention is disclosing a cache lock method which is a modification of the cache miss decision circuit at cache miss to the conventional cache lock method.

Figure 6:
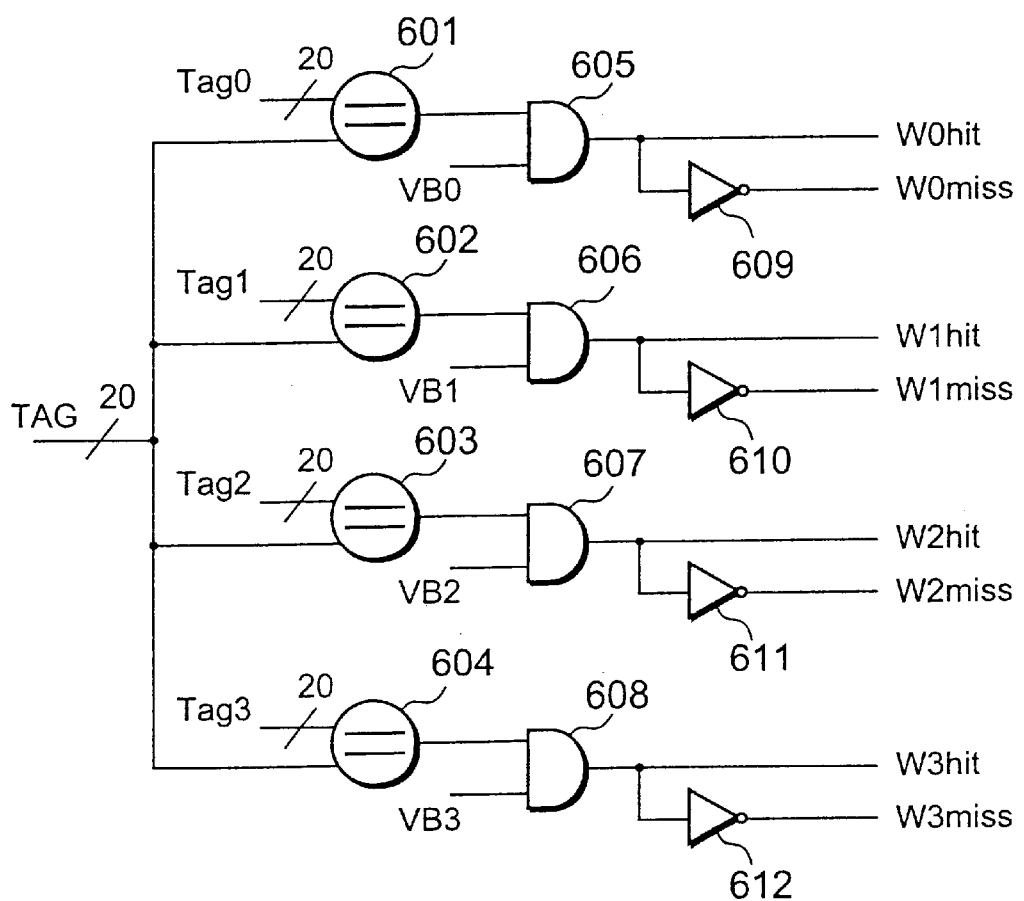
FIG. 6 is a block diagram showing logic generation of hit/miss lock signals in a conventional cache device.
Figure 14:
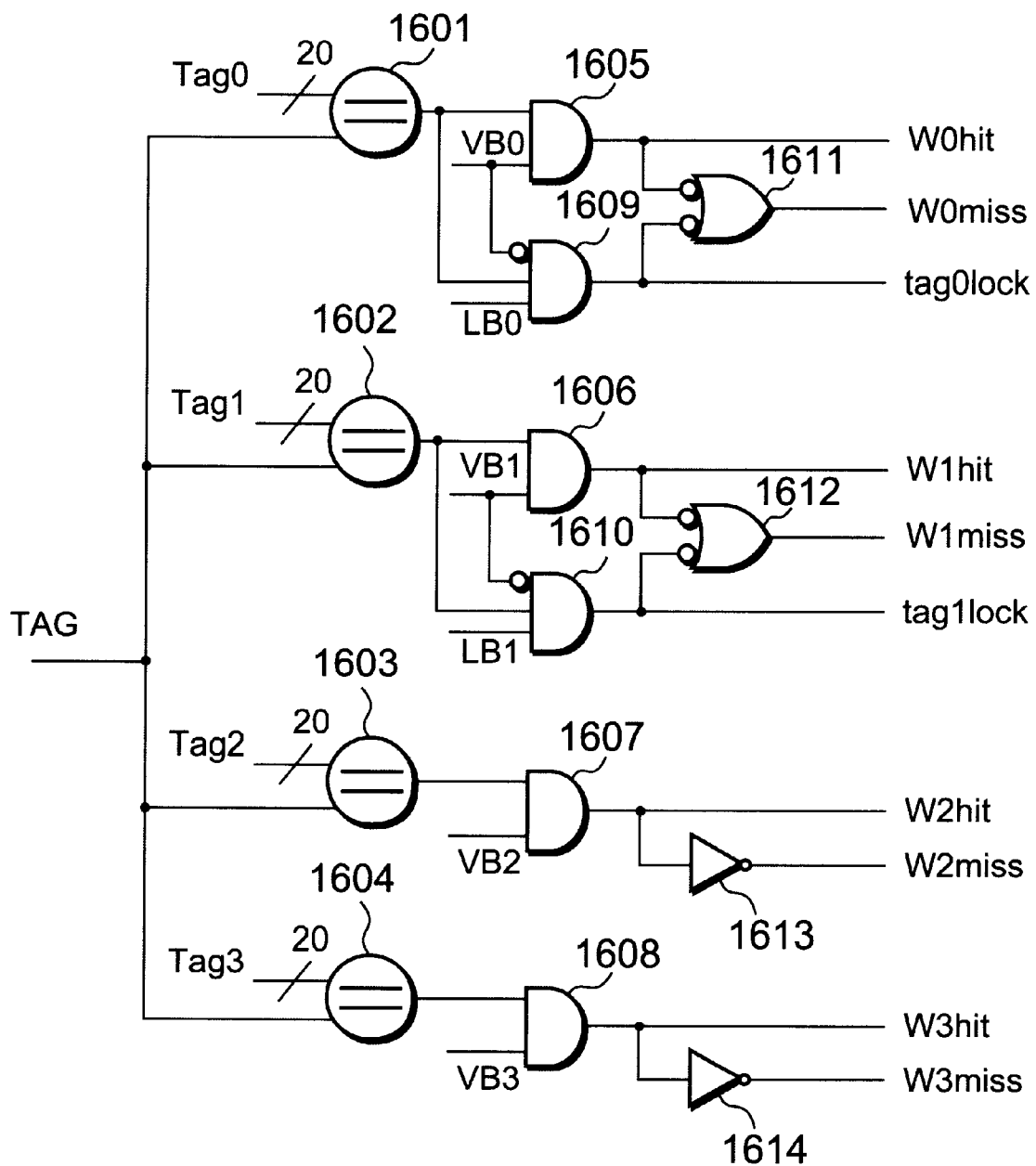
FIG. 14 is a block diagram showing the generation of logic of hit/miss lock signals in the cache lock device according to this invention.

That is, in this invention, conventional hit/miss circuit as shown in FIG. 6 is modified to a circuit as shown in FIG. 14. This circuit is provided with four comparator circuits 1601 to 1604 which compare a TAG of 20 bits with respective ones of Tagn (n=0 to 3) of 20 bits, four AND gates 1605 to 1608 which receive the outputs of the comparator circuits 1601 to 1604 to the respective one ends and receive the corresponding valid bits VBn (n=0 to 3) to the other ends respectively, two AND gates 1609 and 1610 of three inputs which respectively receive the outputs of the comparator circuits 1601 and 1602, the inverted signals of the valid bits VB0 and VB1, and the lock bits LB0 and LB1, two OR gates 1611 and 1612 which receive the inverted outputs of the AND gates 1605 and 1606 to the respective one ends and the inverted signals of the AND gates 1609 and 1610 to the other ends respectively, and inverters 1613 and 1614 which receive the outputs of the AND gates 1607 and 1608, respectively.

Namely, the cases of TAG=Tagn and VBn=0 and LBn=1 (n=0 and 1) are separated from the conventional Wnmiss (n=0 and 1), and tagnlock (n=0 and 1) are generated.

When tagnlock=1 (n=0 and 1), it represents the state in which the entry corresponding to the designated memory address is locked in the cache while storing an invalid data. Accordingly, by arranging to store data read from the memory in a locked entry, it is possible to prevent the presence of an entry which is kept locked while holding an invalid data in the cache.

In other words, if the tag data of the designated memory address by the cache lock instruction is TAG, and its index is Index[adder], it is only needed to determine the way (W0 or W1 in this embodiment) of the cache desired to be made resident by the lock instruction, and write Tag[adder] to the tag part of the entry which has Index[adder] as its index, and write 1 to the lock bit.

Next, the case of making access to this memory address after this situation will be considered.

Assume that an entry which locks data desired to be made resident is set in the way W0. In the first access, the tag, data, valid bit, lock bit and LRU bit of the entry are read from the way W0 (this is because the index of this memory address is the offset of the entry).

Since in a cache hit the operation is the same as in the conventional case, its description will be omitted, and only the cache miss will be described.

In this invention, due to the hit/miss circuit, Tag0lock is 1 when the tag data TAG and Tag0 are equal, the lock bit LB0 is 1, and the valid bit VB0 is 0.

Figure 7A:
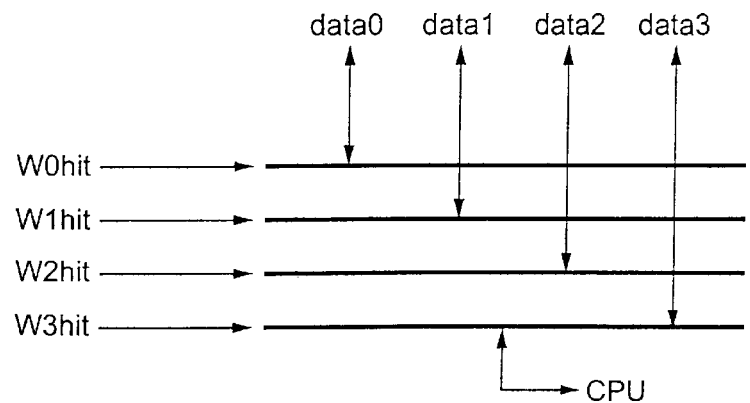
FIG. 7(A) is a diagram describing the connection relation between the CPU and the cache apparatus due to a hit signal in the conventional cache apparatus.
Figure 7B:
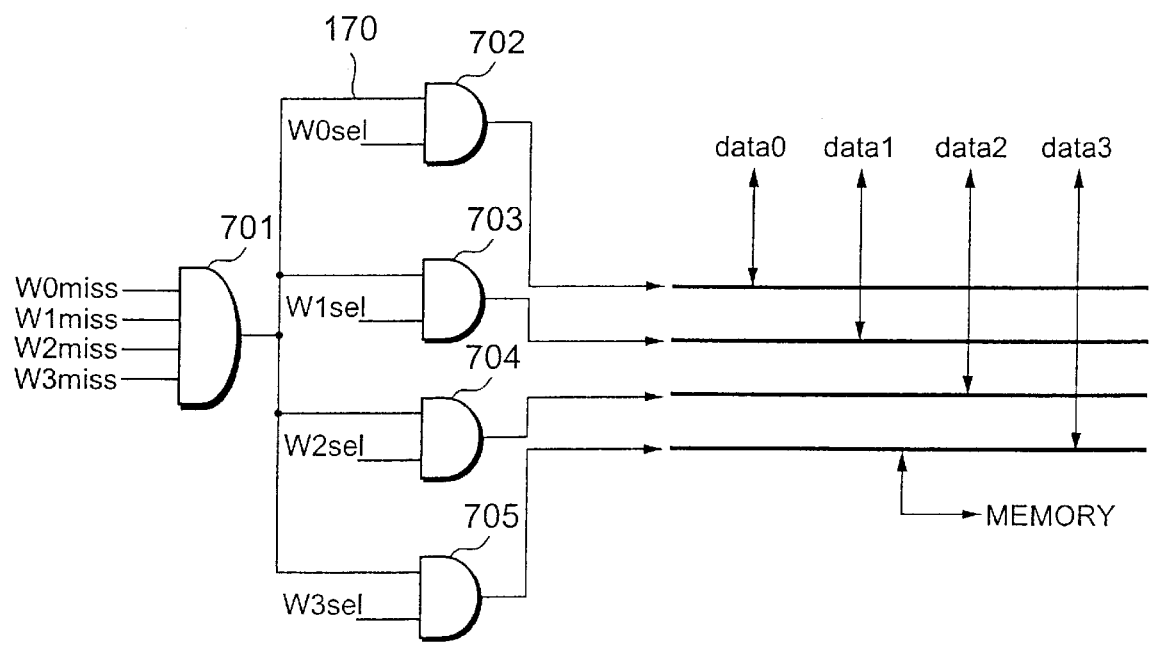
FIG. 7(B) is a diagram describing the connection relation between the memory and the caches at a cache miss in the conventional cache apparatus.
Figure 8:
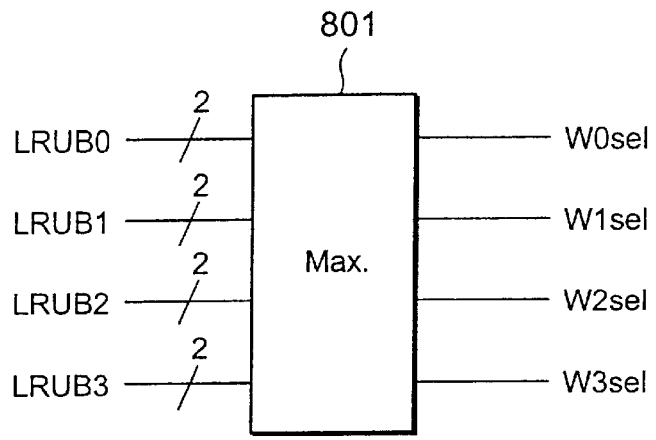
FIG. 8 is a block diagram describing the generation of select logic when there exists no lock bit in the conventional cache apparatus.
Figure 9:
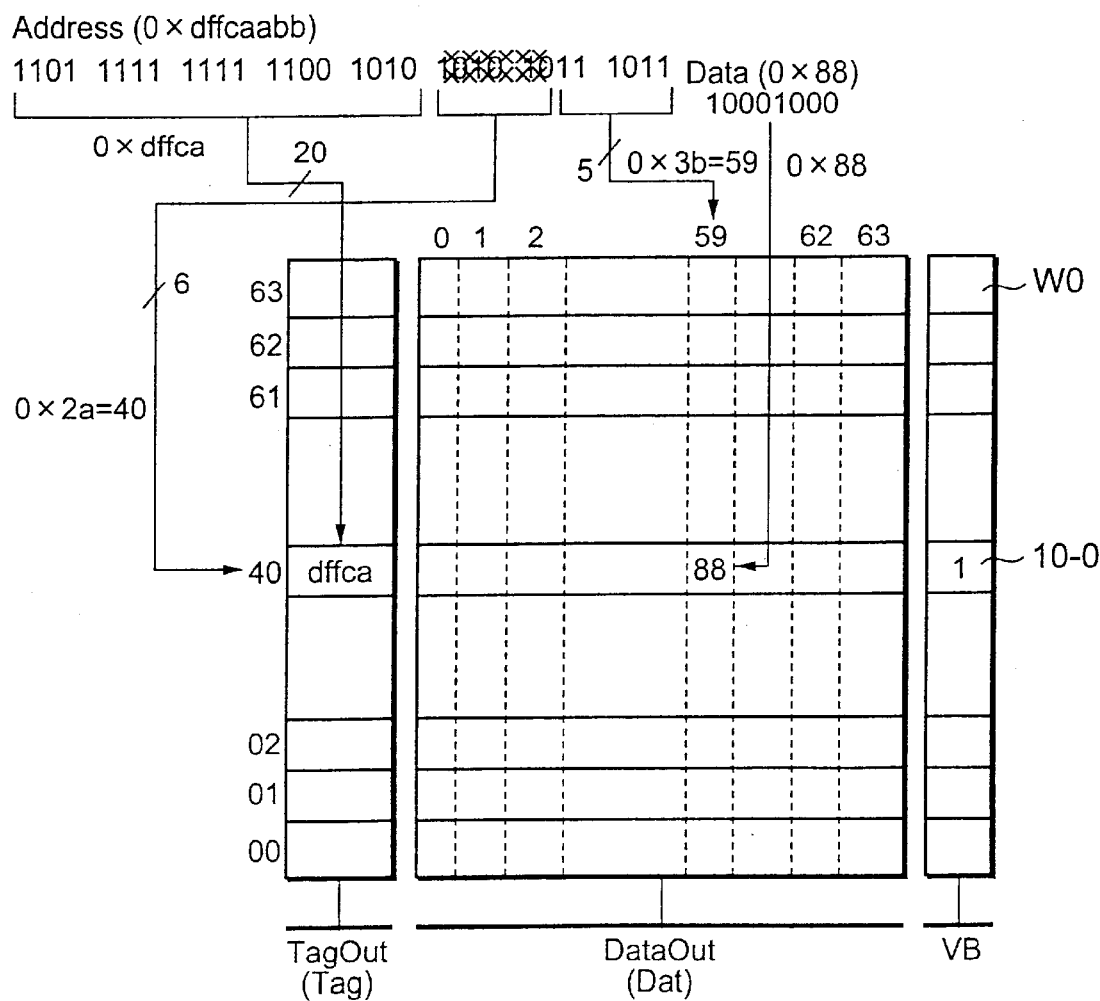
FIG. 9 is a block diagram showing a specific example of the configuration of the cache apparatus used in the conventional cache lock device.
Figure 10:
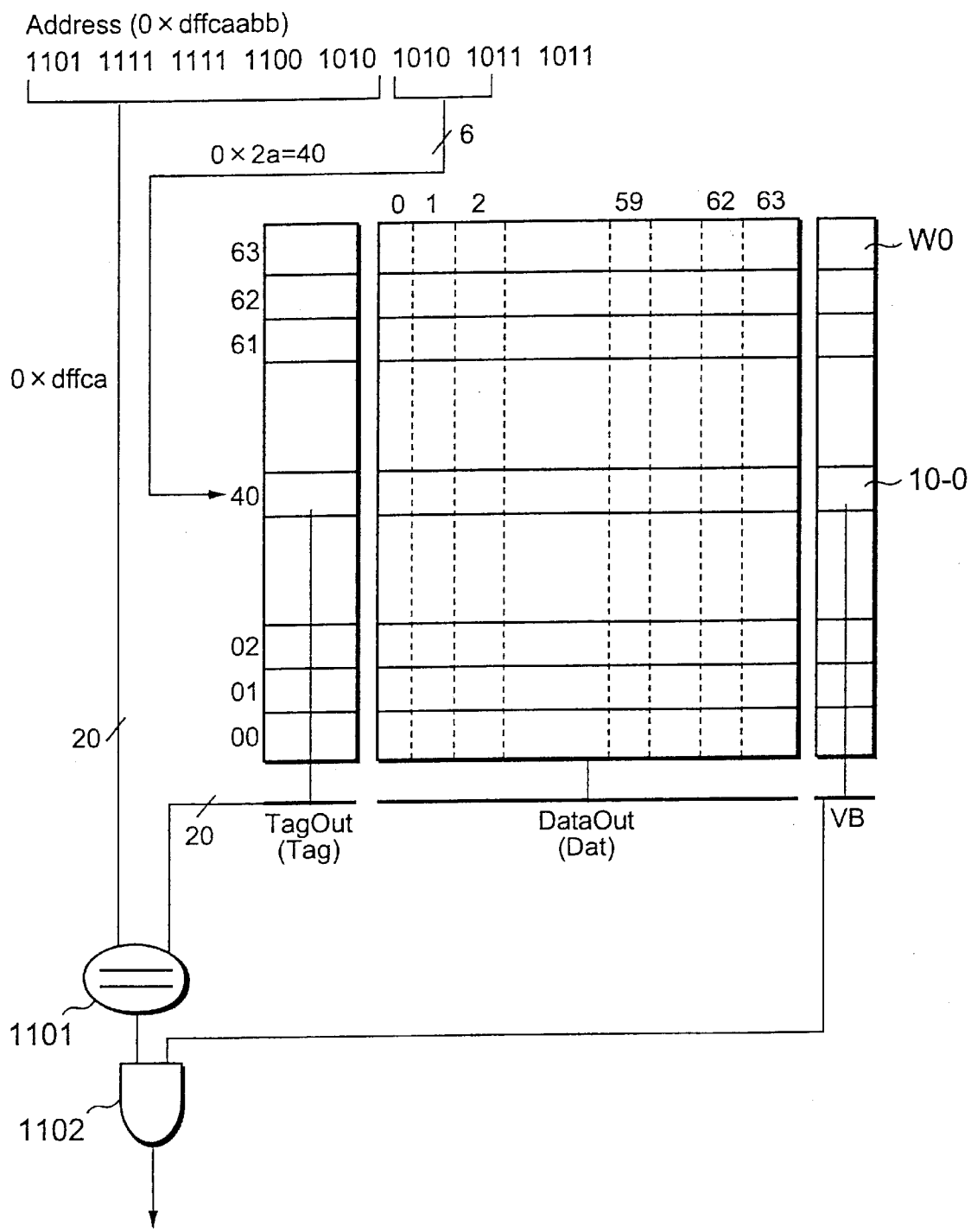
FIG. 10 is a diagram describing an example of discrimination method of stored data in the conventional cache apparatus.
Figure 11:
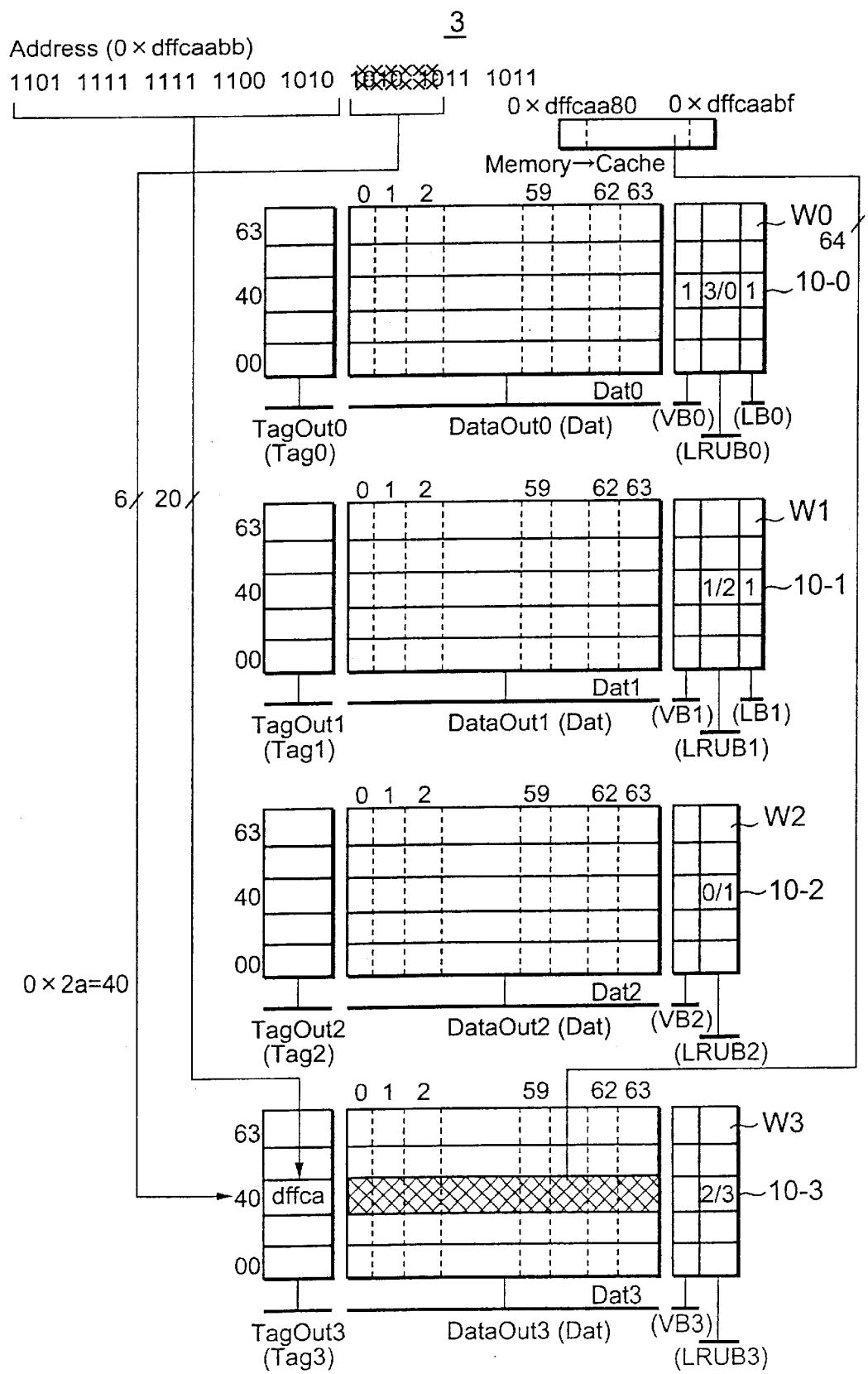
FIG. 11 is a diagram describing an example of replacement method of data using lock bit in the conventional cache lock device.
Figure 12:
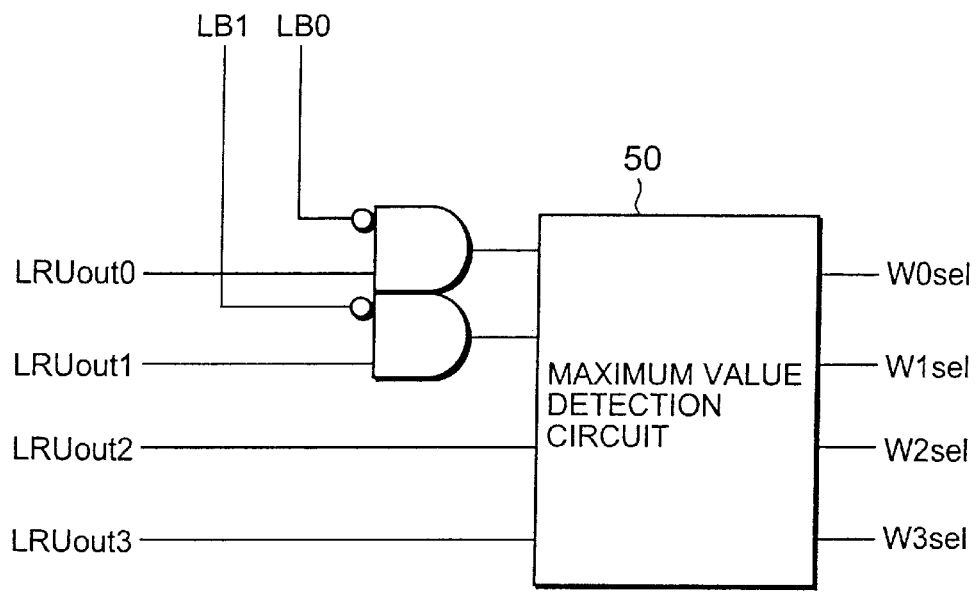
FIG. 12 is a diagram for describing an example of the selection method of a way in the conventional cache apparatus.
Figure 13:
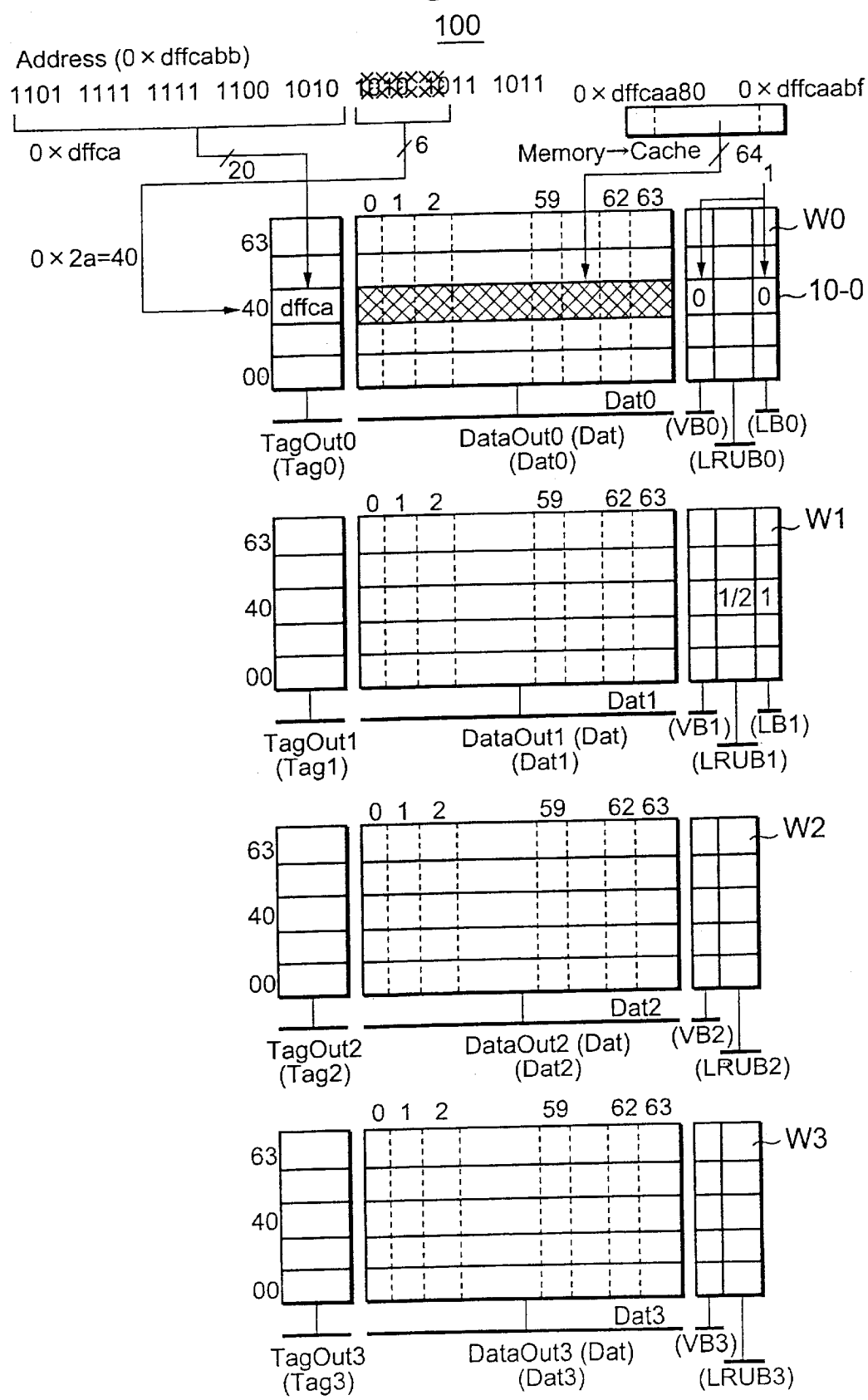
FIG. 13 is a block diagram for describing the operation at execution of a cache lock instruction in the conventional cache lock device.
Figure 16:
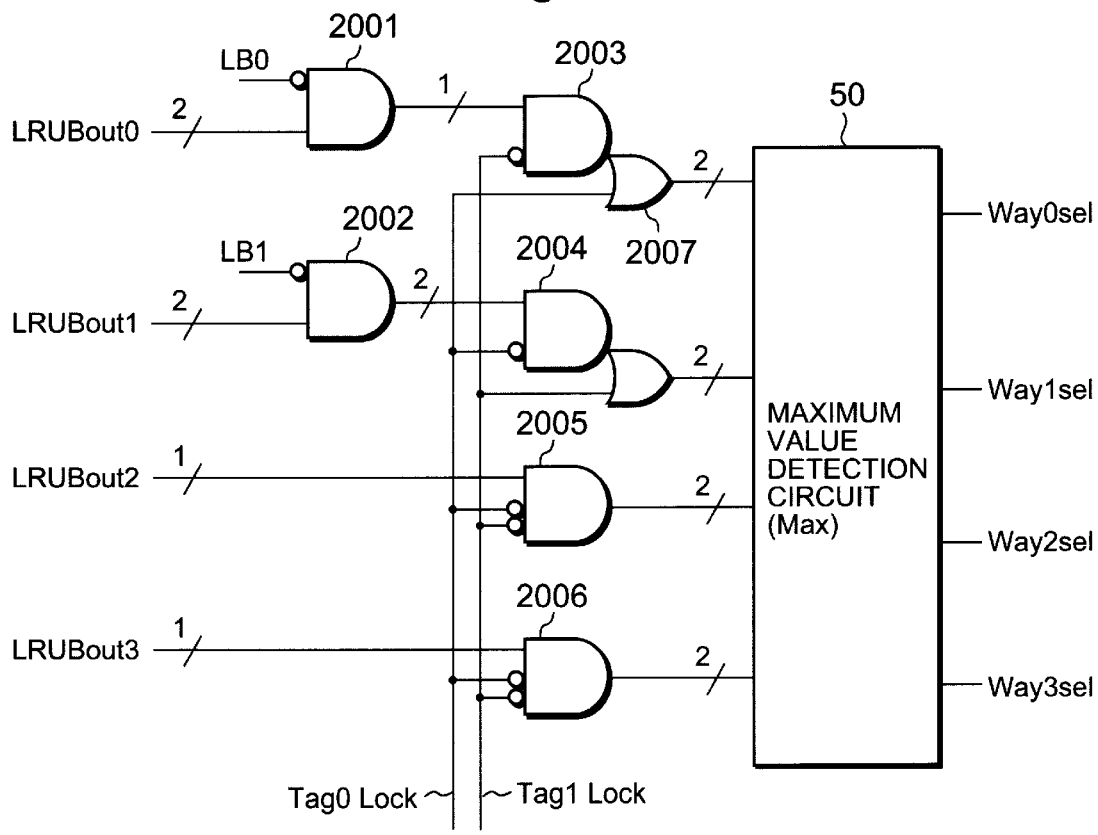
FIG. 16 is a diagram for describing an example of way selection method in the cache apparatus according to this invention.
Figure 17:
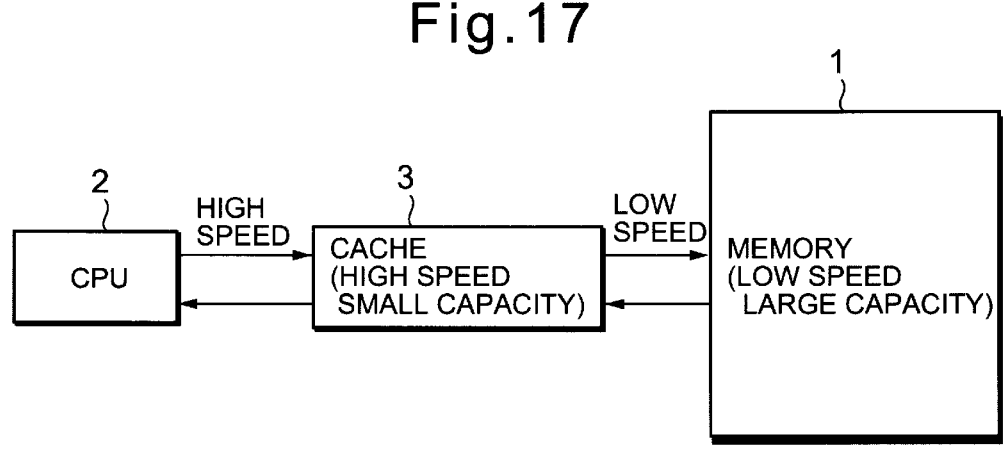
FIG. 17 is a diagram for describing the data transfer among a memory, a cache apparatus, and a CPU.

Accordingly, with a circuit combining, for example, of the bus selection circuit indicated in FIG. 7(B) and the hit/miss detection circuit as shown in FIG. 16, data read from the memory are passed through the data bus data0 of the way W0, and are set in the data part of this entry. At the same time, the valid bit of this entry is set to 1 (VB0=1).

After this, access to this memory address shows cache hit (W0hit=1, and W0miss=0), data are transferred exclusively between the cache and the CPU, and data will not be read from the memory.

Next, the case in which, after data are stored also in all the entries W1 to W3 having the same entry number as this entry, an access to another memory address to be stored in an entry with the same entry number arose next will be considered.

In this case, either one of the entries having the same entry number, of the ways W0 to W3, is selected, and a new tag and data are overwritten. However, since TAG=Tag0, VB0=1, LB0=1 lead to W0hit=1, W0miss=0, and tag0lock=0, selection of the path data0-memory in the bus selection circuit will never occur regardless of the value of the LRU bit.

Consequently, this entry of the way W0 will continue to be locked.

Figure 15:
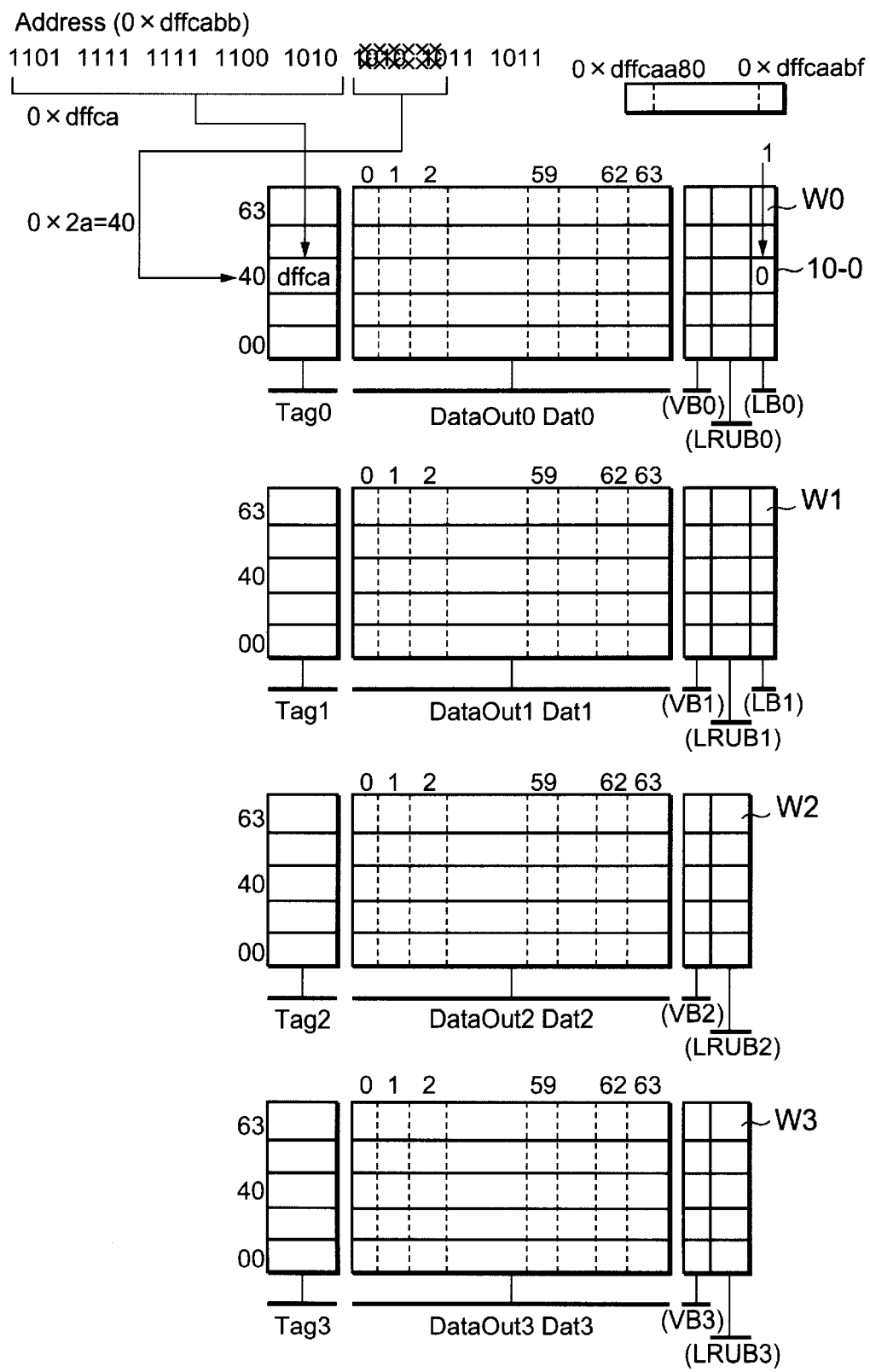
FIG. 15 is a block diagram for describing another specific example concerning the generation of select logic in the cache lock device according to this invention.

In this embodiment, as shown in FIG. 15, in setting the lock bit to 1, only the tag data TAG of the address of the data desired to be made resident is set.

For example, when it is desired to make the data at 0xdffcaa80 to 0xdffcaabf resident in the cache, 0xdffca is written to the tag part of address 40 of the way W0 or W1 having the lock bit, and set the lock bit to 1.

In this construction, it is not necessary that the entry is storing a valid data at the time of setting the lock bit to 1. At the timing where the program actually makes access to data desired to be made resident, the data are transferred from the memory to an entry whose lock bit is set to 1, and the entry is excluded thereafter from the objects of overwriting of new data.

As an example, the case in which 0xdffca is written to the tag part of address 40 of the way W0 and 1 is written to the lock bit, in order to make data at 0xdffcaa80 to 0xdffcaabf resident, will be described.

At this timing, data at 0xdffcaa80 to 0xdffcaabf are not yet transferred to address 40 of the way W0. Accordingly, the valid bit VB of address 40 of the way W0 is remaining at 0.

After this, assume that a (first) access to address 0xdffcaa80 to address 0xdffcaabf occurred in the program. At this time, the tag output TagOut0 of the way W0 is 0xdffca, and the tag data (TAG) of the address which is making access is also 0xdffca, so the output of the comparator of the way W0 is 1, the output of the lock bit (LB0) of the lock bit LB of the way W0 is also 1, and the output (VB0) of the valid bit VB of the way W0 is 0, so Tag0lock of the hit/miss circuit in FIG. 16 goes to 1, and the data is read to the bus of the way W0 by the bus selection circuit shown in FIG. 7(B).

Accordingly, data at address 0xdffcaa80 to 0xdffcaabf are stored in address 40 of the way W0, and the valid bit VB of address 40 is set to 1.

Thereafter, since the valid bit VB of address 40 of the way W0 is 1, and the lock bit LB is also 1, the input to the way W0 of the hit/miss circuit in FIG. 16 is 0, and W0sel will never be 1. That is, address 40 of the way W0 is excluded from the objects of data replacement, and data at address 0xdffcaa80 to 0xdffcaabf will be made resident in that address.

The present invention has an effect that it is possible to issue a cache lock instruction preceding the storage of the data of a designated memory address.

That is, in this invention, in locking an entry which stores an invalid data the locking becomes valid (the entry is locked) after storage of a valid data corresponding to the entry, namely, at the time when an access to the entry is generated.

Accordingly, the user can make data of an address desired to be locked in the cache memory by merely designating the address through the cache lock instruction.

Because of this, when the user wants to lock a specified data to be made resident in the cache apparatus, the user can execute locking of the data automatically without being conscious of the timing of application of the locking.

It is apparent that the present invention is not limited to the above embodiment, but may be modified and changed without deviating from the scope and spirit of the invention.

What is claimed is:

1. A cache lock device comprising:

a main memory;

a cache memory;

a CPU which outputs a first address of a corresponding data on said main memory to a bus in response to a cache lock instruction, and outputs a corresponding second address on said main memory in response to an access instruction;

a first entry selection circuit which selects a first entry on the cache memory upon receipt of said first address;

a write circuit which writes a tag data of said first address to a tag part of said first entry;

a lock bit change circuit which sets a lock bit of said first entry active;

a second entry selection circuit which selects a corresponding second entry on said cache memory in response to said second address;

a tag comparator circuit which compares the value TAG of a tag part of said second address with the value tag of said second entry;

a lock bit detection circuit which detects the state of the lock bit of said second entry;

a least recently used (LRU) output conversion circuit which converts the value of an LRU output so as to make said second entry an object of rewriting when the lock bit of the second entry is active and the comparison result of said tag values is in agreement and a valid bit is inactive; and an LRU control circuit which executes writing to an entry of rewrite object determined by said LRU output conversion circuit.

2. The cache lock device as claimed in claim 1, wherein there are a plurality of second entries corresponding to said second address, and said LRU output conversion circuit sets the value of the LRU output of an entry, which has an active lock bit, the comparison result of said tag values in agreement, and an inactive valid bit, among a plurality of said second entries, to a first value, and the LRU outputs of the other entries are set to a second value different from the first value, thereby the value of the LRU output is changed so as to make the entry whose output value is set to the first value an object of rewriting.

3. The cache lock device as claimed in claim 1 or claim 2, wherein the first and second entry selection circuits use identical circuit.

4. The cache lock device as claimed in claim 1 wherein the cache memory is formed by arranging a plurality of ways composed of a collection of a plurality of entries consisting of at least a tag memory array, a data memory array, a valid bit array, and an LRU bit array.

5. The cache lock device as claimed in claim 4, wherein each entry composing at least a part of the ways is provided with a lock bit array.

6. The cache lock device as claimed in claim 5, wherein the cache lock device includes a way selection means which selects one way out of a group consisting of a plurality of ways.

7. The cache lock device as claimed in claim 6, wherein the way selection means includes a means for selecting one way having the lock bit array out of a group consisting of a plurality of ways.

8. The cache lock device as claimed in claim 7, wherein the entry selection circuit is a means for selecting an entry having the same entry number as the index value of the index part included in the address part of data existing in the memory.

9. The cache lock device as claimed in claim 7, wherein the lock bit change circuit is a means which stores the tag data of the tag part constituting data desired to be made resident in the cache apparatus to the tag part constituting the tag memory array of the selected entry, then sets the value of the lock bit constituting the lock bit array in the entry to the second value.

10. The cache lock device as claimed in claim 7, wherein the cache lock device includes a valid bit setting means which after the lock bit value in the specified entry is set to the second value, data in the data part of the data to be made resident is stored further in the data part constituting the data memory array of the entry, then the value of the valid bit constituting the valid bit array of the entry is set to the second value.

11. The cache lock device as claimed in claim 7, wherein the lock bit detection circuit is a means which judges whether the lock bit array is provided, or when the lock bit array is provided, judges whether the value of the lock bit is the second value or the first value, for each of the plurality of selected entries.

12. The cache lock device as claimed in claim 7, wherein the LRU output conversion circuit includes a means in which the LRU bit values allocated to respective entries to hold the order of acceptance of accesses are changed, among the entries having the same index number in various ways, or do not change under specified conditions or set at desired values, whenever an access is made to a specified entry.

13. The cache lock device as claimed in claim 7, wherein the LRU control circuit includes a means which executes the operation of determining the LRU access based on the LRU values of various entries to output an overwrite enable signal to the least recently accessed entry, that is, the entry with the largest LRUB value, writing data on the bus at this time to the data part of the corresponding entry, and setting the valid bit to the second value.

14. The cache lock device as claimed in claim 7, wherein, for making data resident in the cache apparatus, the cache lock device is constructed such that it is only needed at the time of executing the cache lock instruction, to set the lock bit by storing only the tag part of the data desired to be made resident to the specified entry, and the data part of the data desired to be made resident is automatically stored in the specified entry which executed the cache lock instruction at the timing where an access instruction is executed to the data desired to be made resident.

15. The cache lock device as claimed in claim 1, wherein the lock bit change circuit is a means which stores the tag data of the tag part constituting data desired to be made resident in the cache memory to the tag part constituting the tag memory array of the selected entry, then sets the value of the lock bit constituting the lock bit array in the entry to a second value.

16. The cache lock device as claimed in claim 1, wherein the cache lock device includes a valid bit setting means which after the lock bit value in the specified entry is set to the second value, data in the data part of the data to be made resident is stored further in the data part constituting the data memory array of the entry, then the value of the valid bit constituting the valid bit array of the entry is set to the second value.

17. The cache lock device as claimed in claim 1, wherein the lock bit detection circuit is a means which judges whether the lock bit array is provided, or when the lock bit array is provided, judges whether the value of the lock bit is the second value or the first value, for each of the plurality of selected entries.

18. The cache lock device as claimed in claim 1, wherein the LRU output conversion circuit includes a means in which the LRU bit values allocated to respective entries to hold the order of acceptance of accesses are changed, among the entries having the same index number in various ways, or do not change under specified conditions or set at desired values, whenever an access is made to a specified entry.

19. The cache lock device as claimed in claim 1, wherein the LRU control circuit includes a means which executes the operation of determining the LRU access based on the LRU values of various entries to output an overwrite enable signal to the least recently accessed entry, that is, the entry with the largest LRUB value, writing data on the bus at this time to the data part of the corresponding entry, and setting the valid bit to the second value.

20. The cache lock device as claimed in claim 1, wherein, for making data resident in the cache apparatus, the cache lock device is constructed such that it is only needed at the time of executing the cache lock instruction, to set the lock bit by storing only the tag part of the data desired to be made resident to the specified entry, and the data part of the data desired to be made resident is automatically stored in the specified entry which executed the cache lock instruction at the timing where an access instruction is executed to the data desired to be made resident.

21. The cache lock device as claimed in claim 1, wherein the entry selection circuit is a means for selecting an entry having the same entry number as the index value of the index part included in the address part of data existing in the memory.

22. In a cache lock device comprising a main memory, a cache memory formed by arranging a plurality of ways composed of a collection of a plurality of entries consisting of at least a tag memory array, a data memory array, a valid bit array, and an LRU bit array, where a lock bit array is supplied to each entry constituting at least a part of the ways, and a CPU which outputs the address of data to be transferred to a corresponding cache memory on said main memory in response to a cache lock instruction, a load/store instruction or the like, the cache lock device composed of an entry selection circuit which, in transferring data to be transferred from the main memory to the cache memory, selects from respective ones of the plurality of ways those entries having the same entry number as an index value of an index part constituting data to be transferred in response to a load instruction or a storage instruction, a lock bit detection circuit which detects whether the lock bit array is supplied to each of the plurality of selected entries and outputs a discrimination signal, a valid bit decision circuit which judges whether a valid bit in the entry is a second value when the discrimination signal from the lock bit detection circuit indicates that there is a lock bit and its value is the second value, a data overwrite disable means which inhibits the overwrite on the data in the data part constituting the data desired to be transferred to the data part of the entry when the discrimination signal of the valid bit discrimination circuit indicates that the valid bit in the entry is the second value, a valid bit rewrite circuit which permits overwrite of data on the data part constituting the data to be transferred to the data part of the entry and rewrite the bit value of the valid bit in the valid bit array of the entry to the second value when the value of the lock bit in the specified entry is the second value and when a tag value of a tag part of the selected entry agrees with the tag value of the tag part constituting the data to be transferred and the valid bit value in the valid bit array is a first value, and an LRU output conversion circuit which converts the LRU bit value to the first value.

23. The cache lock device as claimed in claim 22, wherein the cache lock device is further provided with an LRU control circuit by which, when either the lock bit array is not provided or when the lock bit array is provided and the value of the lock bit is the first value, the LRU bit arrays in respective entries of a plurality of selected entries are mutually compared to select the entry with the largest LRU bit value out of the entries, and overwrite the data of the data part constituting the data to be transferred on the data part of the entry, as well as rewrite the bit value of the valid bit in the valid bit array of the entry to the second value.

24. The cache lock device as claimed in claim 23, wherein, for making data resident in the cache apparatus, the cache lock device is constructed such that it is only needed at the time of executing the cache lock instruction, to set the lock bit by storing only the tag part of the data desired to be made resident to the specified entry, and the data part of the data desired to be made resident is automatically stored in the specified entry which executed the cache lock instruction at the timing where an access instruction is executed to the data desired to be made resident.

25. The cache lock device as claimed in claim 22, wherein, for making data resident in the cache apparatus, the cache lock device is constructed such that it is only needed at the time of executing the cache lock instruction, to set the lock bit by storing only the tag part of the data desired to be made resident to the specified entry, and the data part of the data desired to be made resident is automatically stored in the specified entry which executed the cache lock instruction at the timing where an access instruction is executed to the data desired to be made resident.

26. In a cache lock device comprising a main memory, a cache memory formed by arranging a plurality of ways composed of a collection of a plurality of entries consisting of at least a tag memory array, a data memory array, a valid bit array, and an LRU bit array, and a CPU which outputs the address of a corresponding data on said main memory in response to a cache lock instruction, a load instruction, a store instruction or the like, a cache lock method, employed in transferring data to be made resident in the cache memory, comprising a first step of selecting data to be transferred to the cache memory and extracting an index value of a designated address, a second step of selecting from each way an entry having the same entry number as an index value of the data to be transferred to the cache memory, a third step of discriminating for each of selected entries whether it has a lock bit LB, a fourth step, when it is found in the third step that there exist entries having a lock bit LB among the selected entries, of judging whether the lock bit LB is a second value or a first value, a fifth step, when it is found in the fourth step that the lock bit LB of the selected entry is the second value, of comparing the value of a tag part of the entry with a tag value of the designated address, a sixth step, when it is found in the fifth step that the lock bit LB of the entry is the second value and the comparison result of the tag values is in agreement, of judging whether the value of the valid bit of the entry is the second value or the first value, a seventh step, when it is found in the sixth step that the value of the lock bit is the second value but the comparison result of the tag values is in disagreement or the value of the valid bit is the second value, of masking the LRU output of the entry to the first value to inhibit the overwrite on the entry, an eighth step, when it is found in the sixth step that the value of the lock bit is the second value, the comparison result of the tag values is in agreement, and the value of the valid bit is the first value, of setting the LRU output of the entry to the second value, and masking the LRU outputs of the other selected entries to the first value, to make the entry an object of overwriting, a ninth step of selecting the entry with the largest LRU output from among the selected entries, and a tenth step of executing the overwrite of data to the entry selected in the ninth step, and writing the second value to the valid bit.

* * * * *